United States Patent
Hines

(10) Patent No.: US 7,003,777 B2
(45) Date of Patent: Feb. 21, 2006

(54) COORDINATION-CENTRIC FRAMEWORK FOR SOFTWARE DESIGN IN A DISTRIBUTED ENVIRONMENT

(75) Inventor: Kenneth J. Hines, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 09/886,479

(22) Filed: Jun. 20, 2001

(65) Prior Publication Data

US 2002/0059558 A1 May 16, 2002

Related U.S. Application Data

(60) Provisional application No. 60/213,496, filed on Jun. 23, 2000.

(51) Int. Cl.
G06F 9/54 (2006.01)

(52) U.S. Cl. .............. 719/316; 719/315; 717/120; 709/223

(58) Field of Classification Search ............. 719/315, 719/316; 717/100, 102, 103, 120–123; 709/223–226
See application file for complete search history.

(56) References Cited

U.S. PATENT DOCUMENTS

| | | | |
|---|---|---|---|
| 4,965,743 A | * | 10/1990 | Malin et al. |
| 5,095,421 A | | 3/1992 | Freund |
| 5,428,782 A | | 6/1995 | White .............. 395/650 |
| 5,485,617 A | * | 1/1996 | Stutz et al. ........... 719/315 |
| 5,551,035 A | * | 8/1996 | Arnold et al. ........ 719/315 |
| 5,581,691 A | | 12/1996 | Hsu et al. ........... 395/182.13 |
| 5,596,750 A | | 1/1997 | Li et al. |
| 5,642,478 A | | 6/1997 | Chen et al. ........ 395/183.21 |

(Continued)

FOREIGN PATENT DOCUMENTS

| EP | 0 822 484 A2 | 2/1998 |
|---|---|---|
| EP | 0 881 568 A2 | 5/1998 |

OTHER PUBLICATIONS

Brunner, R.J. et al. "An Object Oriented Approach to Astonomical Databases." Proc. 4th Ann. Conf. Astronomical Data Analysis Software and Systems, Baltimore, 1994.*
Ball, C.H. et al. "Data Access and Trasnportation Services for the CORBA Environment." IEEE. 1998.*
Newman, David S. "Managing CORBA Method Servers: Part I of Systems Management for the Distributed Object Environment." Distributed Object Computing Magazine. Mar. 1997.*
U.S. Appl. No. 09/885,456, System and Method for Debugging Distributed Software Environments.
U.S. App. No. 09/886,479, Coordination–Centric Framework for Software Design in a Distributed Environment.
U.S. Appl. No. 09/885,456, System and Method for Debugging Distributed Software Environments.
U.S. Appl. No. 09/886,479, Coordination–Centric Framework for Software Design in a Distributed Environment.

(Continued)

Primary Examiner—Lewis A. Bullock, Jr.
(74) Attorney, Agent, or Firm—Michael R. Barre

(57) ABSTRACT

The present invention relates to a coordination-centric framework for implementing a software system in a distributed computing environment. In a presently preferred embodiment the software system is a software design environment having authoring, synthesis, and debugging tools. The coordination-centric framework is flexible enough to interconnect tools and robust enough that tool designers can use it for all aspects of tool interconnection without requiring costly workarounds. The coordination-centric framework uses modular and reusable software elements and standardized interfaces to connect the software elements.

12 Claims, 26 Drawing Sheets

U.S. PATENT DOCUMENTS

| | | | | |
|---|---|---|---|---|
| 5,694,539 A | * | 12/1997 | Haley et al. | |
| 5,724,508 A | | 3/1998 | Harple, Jr. et al. | 395/200.04 |
| 5,737,607 A | * | 4/1998 | Hamilton et al. | 719/316 |
| 5,790,778 A | * | 8/1998 | Bush et al. | |
| 5,794,046 A | | 8/1998 | Meier et al. | 395/704 |
| 5,819,270 A | | 10/1998 | Malone et al. | 707/7 |
| 5,870,588 A | | 2/1999 | Rompaey et al. | 395/500 |
| 5,920,717 A | | 7/1999 | Noda | 395/701 |
| 5,933,639 A | | 8/1999 | Meier et al. | |
| 5,941,945 A | | 8/1999 | Aditham et al. | |
| 5,949,998 A | * | 9/1999 | Fowlow et al. | 717/105 |
| 5,980,096 A | * | 11/1999 | Thalhammer-Reyero | |
| 5,999,728 A | | 12/1999 | Cable | |
| 6,003,037 A | * | 12/1999 | Kassabgi et al. | 707/103 R |
| 6,038,381 A | | 3/2000 | Munch et al. | |
| 6,044,211 A | | 3/2000 | Jain | |
| 6,052,527 A | | 4/2000 | Delcourt et al. | 395/705 |
| 6,083,277 A | * | 7/2000 | Fowlow et al. | 717/107 |
| 6,083,281 A | | 7/2000 | Diec et al. | 717/128 |
| 6,125,392 A | | 9/2000 | Labatte et al. | 709/224 |
| 6,134,676 A | | 10/2000 | VanHuben et al. | 714/39 |
| 6,154,876 A | | 11/2000 | Haley et al. | |
| 6,192,419 B1 | | 2/2001 | Aditham et al. | |
| 6,298,476 B1 | * | 10/2001 | Misheski et al. | |
| 6,314,555 B1 | * | 11/2001 | Ndumu et al. | |
| 6,317,773 B1 | | 11/2001 | Cobb et al. | |
| 6,340,977 B1 | * | 1/2002 | Lui et al. | |
| 6,347,374 B1 | | 2/2002 | Drake et al. | 709/224 |
| 6,470,388 B1 | | 10/2002 | Niemi et al. | |
| 6,470,482 B1 | * | 10/2002 | Rostoker et al. | |
| 6,539,501 B1 | | 3/2003 | Edwards | 717/128 |
| 6,567,818 B1 | * | 5/2003 | Frey et al. | 707/103 R |
| 6,665,819 B1 | | 12/2003 | Gopalan et al. | |
| 6,701,382 B1 | * | 3/2004 | Quirt et al. | 719/316 |
| 6,718,294 B1 | | 4/2004 | Bortfeld | |
| 2002/0078431 A1 | * | 6/2002 | Reps | |

OTHER PUBLICATIONS

U.S. Appl. No. 09/881,391, System and Method for Coordination Centric Design of Software Systems.
U.S. Appl. No. 09/888,061, Evolution Diagrams for Debugged Distributed Embedded Software Applications.
U.S. Appl. No. 09/885,448, Behavioral Abstractions for Debugging Coordination–Centric Software Designs.
U.S. Appl. No. 09/886,459, Data Structure and Method for Detecting Constraint Conflicts in Coordination–Centric Software Systems.
U.S. Appl. No. 09/888,082, Dynamic Control Graphs for Analysis of Coordination–Centric Software Designs.
U.S. Appl. No. 10/040,971, Coordination Synthesis for Software Systems.
U.S. Appl. No. 09/886,479, Coordination–Centric Framework for Software Design in a Distributed Environment.
U.S. Appl. No. 09/881,391, System and Method for Coordination Centric Design of Software Systems.
U.S. Appl. No. 09/888,061, Evolution Diagrams for Debugged Distributed Embedded Software Applications.
U.S. Appl. No. 09/885,448, Behavioral Abstractions for Debugging Coordination–Centric Software Designs.
U.S. Appl. No. 09/886,459, Data Structure and Method for Detecting Constraint Conflicts in Coordination–Contric Software Systems.
U.S. Appl. No. 09/888,082, Dynamic Control Graphs for Analysis of Coordination–Centric Software Designs.
U.S. Appl. No. 10/040,971, Coordination Synthesis for Software Systems.

"COBRA Overview", (Jul. 1995),2–1 and 18–5.
Baecker, R , et al., "Software visualization for debugging", *CACM vol. 40, No. 4*, (Apr. 1997),44–54.
Bates, P.C. , "Debugging programs in a distributed system environment", *Ph.D. Thesis, University of Massachusetts, Amherst*, (1986).
Bates, P.C. , et al., "High–level debugging of distributed systems: The behavioral abstraction approach", *The Journal of systems and software, vol. 3, No. 4*, (Dec. 1983),255–264.
Bruegge, B , "A portable platform for distributed event environments", *ACM/ONR Workshop on Parallel & Distributed Debugging*, (1991),184–193.
Bryant, R E., "Symbolic boolean manipulation with ordered binary decision diagrams", *ACM Computing Surveys*, (1992),293–318.
Cooper, R , et al., "Consistent detection of global predicates", *ACM/ONR workshop on parallel & distributed debugging*, (1991),167–174.
Fidge, C J., "Logical time in distributed computing systems", *IEEE Computer, 24(8)*, (1991),28–33.
Garg, V K., et al., "Detection of Weak Unstable Predicates in Distributed Programs", *IEEE Transactions on Parallel and Distributed Systems vol., No. 3 Mar. 1994*, (1994), 299–307.
Harter, Jr., P K., et al., "IDD An interactive distributed debugger", *Proc. of the 5th international conference on distributed computing systems*, (1985),498–506.
Khouzam, M , et al., "Single stepping in event–visualization tools", *In processing of the 1996 CAS conference*, (1996), 103–114.
Koehnemann, H , et al., "Towards target–level testing and debugging tools for embedded software", *Conference Proceedings on Tri–ADA '93*, (1993), 288–298.
Kundu, J , "Integrating event– and state–based approaches to the debugging of parallel programs", *Ph.D. thesis, University of Massachusetts, Amherst*, (1996).
Kunz, T , "Abstract behavior of distributed executions with applications to visualization"*Ph.D. thesis, Technische Hochschule Darmstadt, Germany*, (1994).
Mattern, F , "Efficient Algorithms for Distributed Snapshots and Global Virtual Time Approximation", *Journal of Parallel and Distributed Computing vol. 18 No. 4*, (1993).
Mattern, F , "On the relativistic structure of logical time in distributed systems", *Parallel and distributed algorithmns*, (1989).
McMillan, F. , "Symbolic Model Checking: An Approach to the State Explosion Problem", *Ph.D. Thesis, Carnegie Mellon University*, (1992).
Netzer, RH B., et al., "Adaptive message logging for incremental program replay", *IEEE Parallel and distributed technology*, (1993),32–39.
Russell, D L., "State restoration in systems of communicating processes", *IEEE Transactions of software engineering, vol. SE–6, No. 2*, (1980),183–194.
Shende, S , et al., "Event and state–based debugging in TAU: a prototype", *Symposium on parallel and distributed tools*, (1996),21–30.
Side, R S. et al., "A debugger for distributed programs", *Software—Practice and Experience, vol. 24(5*, (1994),507–525.
Taylor, D J., "A prototype debugger for hermes", *Proceedings of the 1992 CAS conference*, (1992),313–326.

Taylor, D J., "Event Displays for Debugging and Managing Distributed Systems", *International Workshop on Network and Systems Management,* (1995).

TSAI, JJ P., et al., "A noninvasive architecture to monitor real–time distributed systems", *IEEE Computer, 23,* (1990), 11–23.

Valot, C , "Characterizing the accuracy of distributed timestamps", *ACM/ONR Workshop on Parallel & Distributed Debugging,* (1993),43–52.

Zernik, D , et al., "Using visualization tools to understand concurrency", *IEEE Software, 9(3),* (1992),87–92.

Ball—Data Access and Transportation Services for the CORBA Environment.

Brunner—An object oriented approach to astronomical databases.

Harter et al 1985—IDD an interactive distributed debugger.

Kunz et al—Poet Target system independent visualizations to complex distributed executions.

Netzer et al 1993—Adaptive message logging for incremental program replay.

Newman—Managing CORBA method servers: Part I of systems management of the distributed object environment.

[Barrett et al., 1996] Barrett, D.J., Clarke, L.A., Tarr, P.L., and Wise, A.E. 1996). A framework for event–based software integration. *ACM Transactions on Software Engineering and Methodology,* 5(4):378–421.

[Borning, 1986] Borning, A. (1986). Classes versus prototypes in object–oriented languages. In *Fall Joint Computer Conference*.

[Chou, 1998] Chou, P. (1998). *Control Composition and Synthesis of Distributed Real–Time Embedded Systems,* Ph.D., thesis, University of Washington.

[Chou et al., 1998] Chou, P., Hines, K., Partridge, K., and Borriello, G. (1998). Control generation for embedded systems based on composition of modal processes. In *Proc. International Conference on Computer–Aided Design*.

[Ciancarini, 1996] Ciancarini, P. (1996). Coordination models and languages as software integrators. *ACM Computing Surveys,* 28(2):300–302.

[DeLine, 1999] DeLine, R. (1999). Avoiding packaging mismatch with flexible packaging. In *Proc. International Conference on Software Engineering,* pp. 97–106.

[Gelernter, 1986] Gelernter, D. (1986). Generative communications in Linda. *ACM Transactions on Programming Languages and Systems,* 7(1).

[Gelernter and Carriero, 1992] Gelernter, D. and Carriero, N. (1992). Coordination languages and their significance. *Communications of the ACM,* 35(2):97–107.

[Hines, 1996] Hines, K. (1996). A Framework for Embedded System Co–simulation with Dynamic Communication Support.

[Hodges, 1999] Hodges, W. (1999). Position paper. DARPA Workshop on Model–based Methods for Embedded Software Creation. (3 pgs).

[Lieberman, 1986] Lieberman, H. (1986). Using prototypical objects to implement shared behavior in object oriented systems. In *OOPSLA '86 Proceedings*.

[Selic, 1998] (1998). Using UML for Modeling Complex Real–Time Systems, pp. 246–256.

[Tallman and Kain, 1998] Tallman, O. and Kain, J. B. (1998). COM versus CORBA: A decision framework. *Distributed Computing*.

Agha, Gul, "Concurrent Object–Oriented Programming," *Communications of the ACM,* vol. 33, No. 9 (Sep. 1990), pp. 125–141.

Ken Hines and Gaetano Borriello, "A Geographically Distributed Framework for Embedded System Design and Validation," *Design Automation Conference, 1998, Proceedings San Francisco, CA, 1998, New York, NY, IEEE,* Jun. 15, 1998, pp. 140–145.

Gopalan Suresh Raj, "A Detailed Comparison of CORBA, DCOM and Java/RMI," *Web Cornucopia, Outline! 1998,* <URL: http//gsraj.tripod.com/misc/compare.html>.

Object Management Group, "The Common Object Request Broker: Architecture and Specification," *CORBA Overview,* Jul. 1995, pp. 2–1–2–17, 4–1–4–6, 6–2–6–5.

Ken Hines and Gaetano Borriello, "Debugging Distributed Implementations of Modal Process Systems".

Pai Chou, Ken Hines, Kurt Partridge and Gaetano Borriello, "Control Generation for Embedded Systems Based on Composition of Modal Processes," pp. 46–53.

Pai H. Chou and Gaetano Borriello, "Synthesis and Optimization of Coordination Controllers for Distributed Embedded Systems," pp. 410–415.

Anderson, Richard J., et al., "Model Checking Large Software Specifications," Department of Computer Science and Engineering, University of Washington (1996 ACM 0–89791–797–9/96/0010), pp. 156–166.

Christopher B. Borchert, "Organization and Management of Distributed Execution Event Histories For Real–Time Debugging," *IEEE,* pp. 343–345.

Mariano P. Consens, Masum Z. Hasan, Alberto O. Mendelzon, "Visualizing and Querying Distributed Event Traces with Hy+," *Computer Systems Research Institute, University of Toronto,* Jun. 1994, pp. 123–141.

Wentong Cai, Wendy J. Milne and Stephen J. Turner, "Graphical Views of the Behavior of Parallel Programs," *Journal of Parallel and Distributed Computing,* Jun. 18, 1993, No. 2, Orlando, FL, USA, pp. 223–230.

Jaffe, Matthew S., et al., "Software Requirements Analysis for Real–Time Process–Control Systems," 8198 IEEE Transactions on Software Engineering, Mar. 17, 1991, No. 3, New York, U.S., pp. 241–257.

Thomas Kunz, David J. Taylor, and James P. Black, Poet: Target–System–Independent Visualizations of Complex Distributed Executions, *IEEE,* 1997, pp. 452–461.

Doug Kimelman and Dror Zernik, "On–the–Fly Topological Sort—A Basis for Interactive Debugging and Live Visualization of Parallel Programs," *8398 ACM Sigplan Notices,* Dec. 28, 1993, No. 12, New York, US, pp. 12–20.

Mikhail Auguston, "Building Program Behavior Models," *Dept. of Computer Science, New Mexico State University,* pp. 19–26.

Stephen Edwards, Luciano Lavagno, Edward A. Lee, et al., "Design of Embedded Systems: Formal Models, Validation, and Synthesis," *Proceedings of the IEEE,* vol. 85, No. 3, Mar. 1997, pp. 366–389.

Pai Chou, Ross Ortega, Ken Hines, et al., "IPChinook: An Integrated IP–based Design Framework for Distributed Embedded Systems," pp. 44–49.

\* cited by examiner

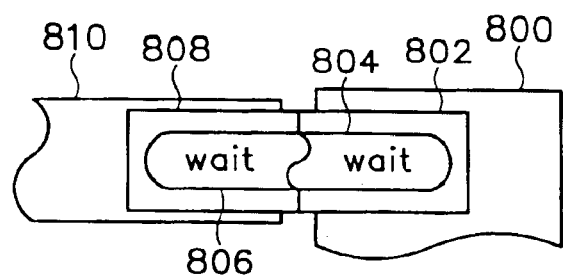
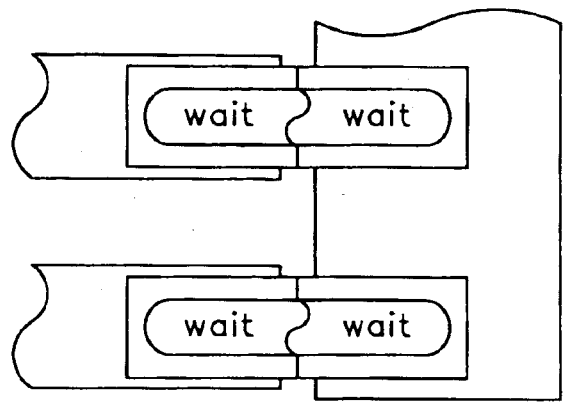
FIG. 8
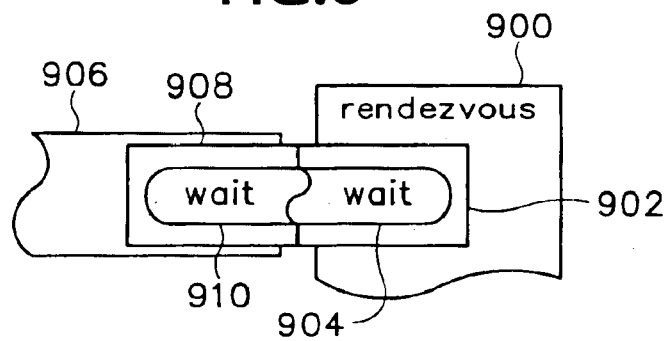
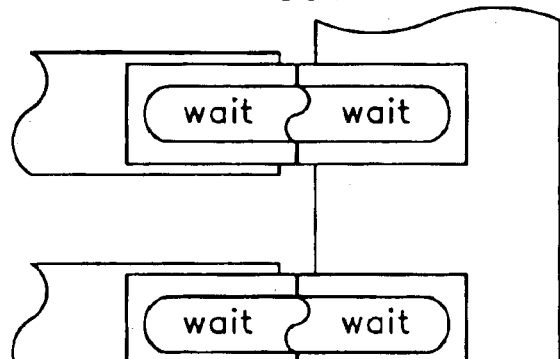
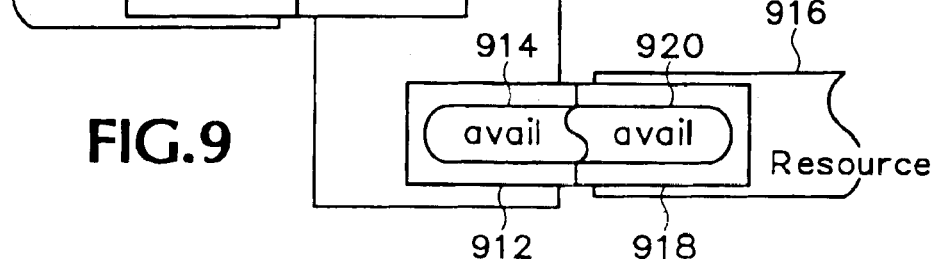
FIG. 9

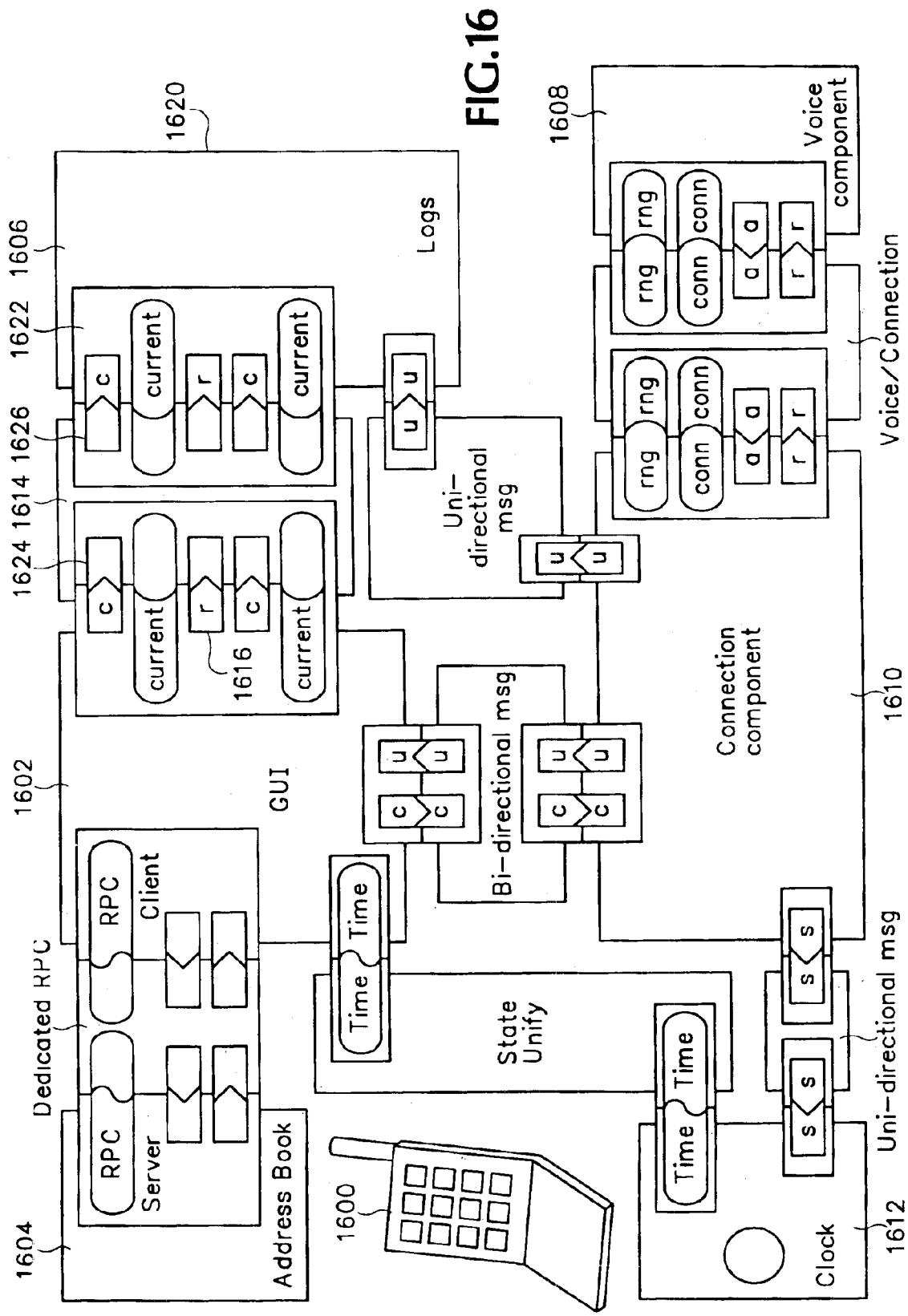

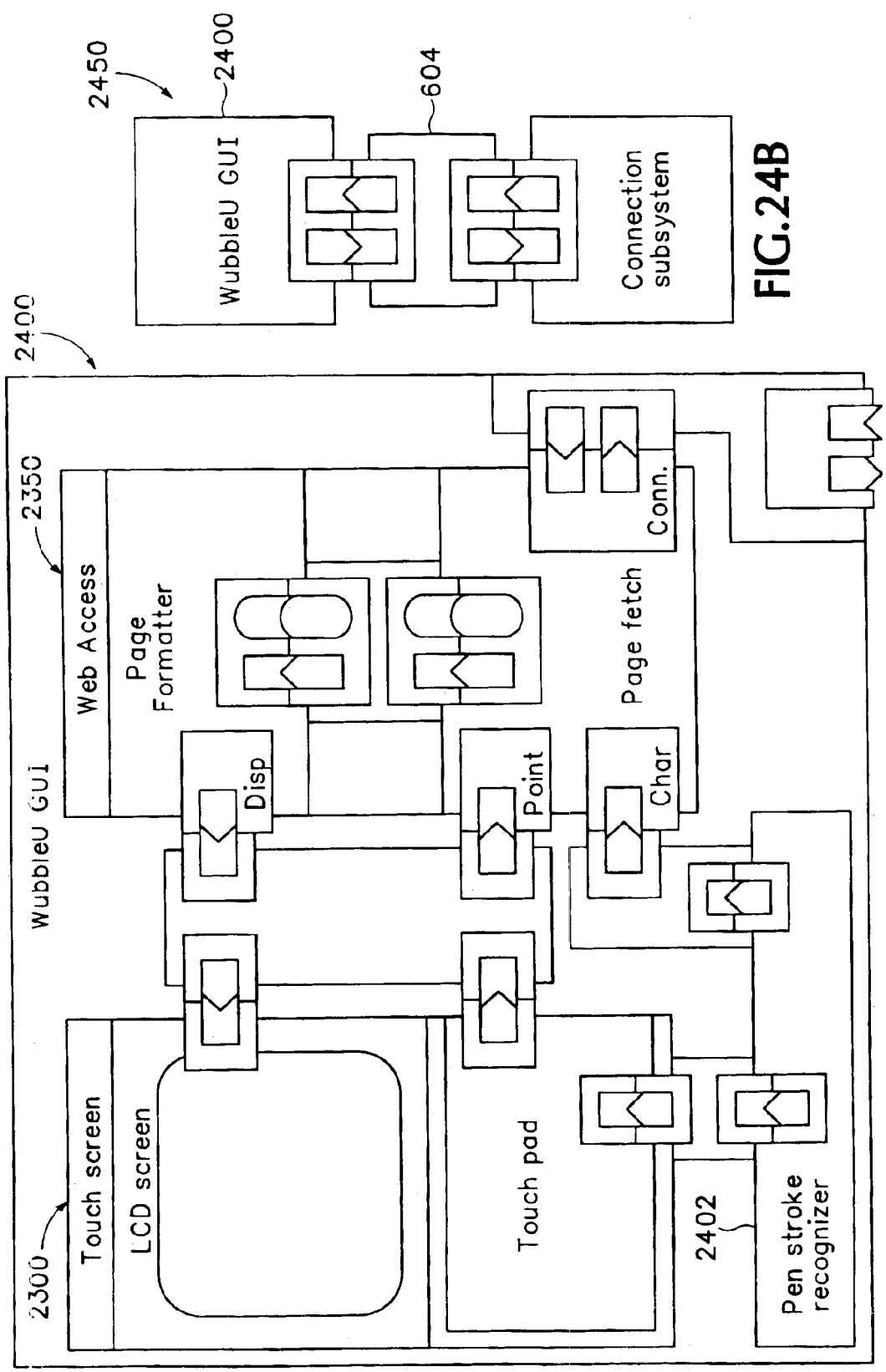

COORDINATION-CENTRIC FRAMEWORK FOR SOFTWARE DESIGN IN A DISTRIBUTED ENVIRONMENT

RELATED APPLICATIONS

This application claims the benefit of U.S. Provisional Application No. 60/213,496 filed Jun. 23, 2000, incorporated herein by reference.

TECHNICAL FIELD

The present invention relates to a coordination-centric framework for designing software systems in a distributed, or networked, computing environment.

BACKGROUND OF THE INVENTION

Typical distributed system infrastructures, such as common object request brokerage architecture (CORBA) and distributed component object model (DCOM), are insufficient for designing software in a distributed environment. CORBA's main strength is in connecting components written in different languages. Unfortunately, CORBA expects all connections between distributed components to be RPC based, which means that continuous stream connections must be dealt with outside of CORBA. DCOM is almost entirely limited to Win32 architectures and is typically not available for use in a Linux environment. Furthermore, neither DCOM or CORBA support explicit and separate coordination protocols between components.

SUMMARY OF THE INVENTION

The present invention relates to a coordination-centric framework for implementing a complex software system in a distributed computing environment. In a presently preferred embodiment the complex software system is a software design environment having authoring, synthesis, and debugging tools. The coordination-centric framework is flexible enough to interconnect tools executing on distributed processing resources and robust enough that tool designers can use it for all aspects of tool interconnection without requiring costly workarounds. The coordination-centric framework uses modular and reusable software elements and standardized interfaces to connect the software elements.

The coordination-centric framework is based on the philosophy that complex software systems should be built from reusable components connected through high-level coordination operators. The coordination-centric framework allows for dynamic object insertion and removal through the use of a general purpose runtime system for managing the interactions between objects.

Additional aspects and advantages of this invention will be apparent from the following detailed description of preferred embodiments thereof, which proceeds with reference to the accompanying drawings.

BRIEF DESCRIPTION OF THE DRAWINGS

FIG. 8 is a barrier synchronization coordinator in accordance with the present invention.

FIG. 9 is a rendezvous coordinator in accordance with the present invention.

FIG. 16 shows a top-level view of the behavior and components for a system for a cell phone.

FIG. 24A is a completed GUI system for a handheld Web browser.

FIG. 24B shows the GUI system for the handheld Web browser combined with the connection subsystem of FIG. 18B in order to access the cellular network of FIG. 15.

DETAILED DESCRIPTION OF PREFERRED EMBODIMENT

Coordination Centric Design Methodology and System

Figure 1:
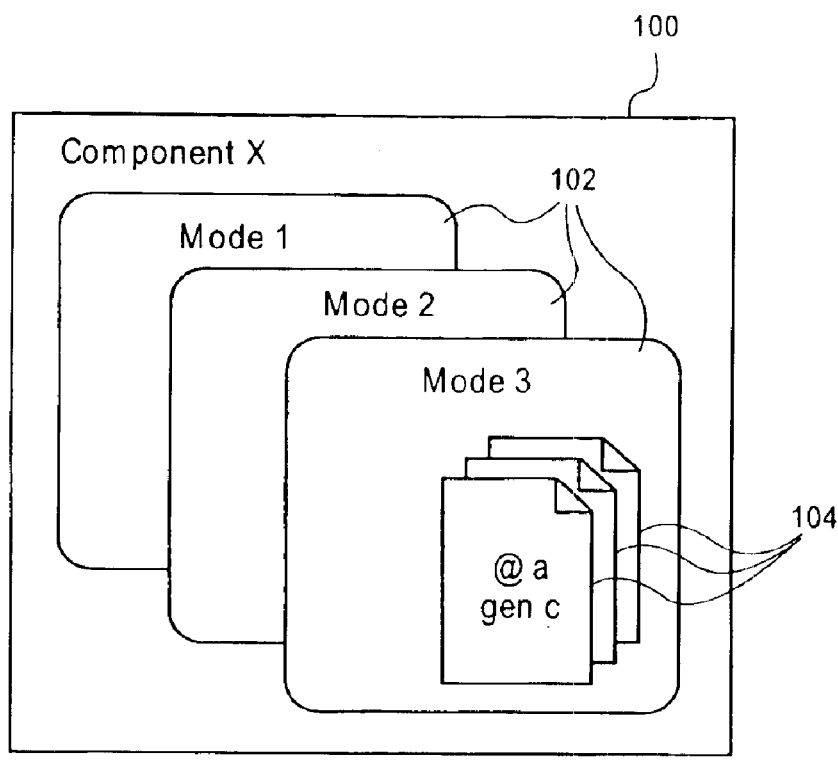
FIG. 1 is a component in accordance with the present invention.

FIG. 1 is an example of a component 100, which is the basic software element within the coordination-centric design framework, in accordance with the present invention. With reference to FIG. 1, component 100 contains a set of modes 102. Each mode 102 corresponds to a specific behavior associated with component 100. Each mode 102 can either be active or inactive, respectively enabling or disabling the behavior corresponding to that mode 102. Modes 102 can make the conditional aspects of the behavior of component 100 explicit. The behavior of component 100 is encapsulated in a set of actions 104, which are discrete, event-triggered behavioral elements within the coordination-centric design methodology. Component 100 can be copied and the copies of component 100 can be modified, providing the code-sharing benefits of inheritance.

Actions 104 are enabled and disabled by modes 102, and hence can be thought of as effectively being properties of modes 102. An event (not shown) is an instantaneous condition, such as a timer tick, a data departure or arrival, or a mode change. Actions 104 can activate and deactivate modes 102, thereby selecting the future behavior of component 100. This is similar to actor languages, in which methods are allowed to replace an object's behavior.

In coordination-centric design, however, all possible behaviors must be identified and encapsulated before runtime. For example, a designer building a user interface component for a cell phone might define one mode for looking up numbers in an address book (in which the user interface behavior is to display complete address book entries in formatted text) and another mode for displaying the status of the phone (in which the user interface behavior is to graphically display the signal power and the battery levels of the phone). The designer must define both the modes and the actions for the given behaviors well before the component can be executed.

Figure 2:
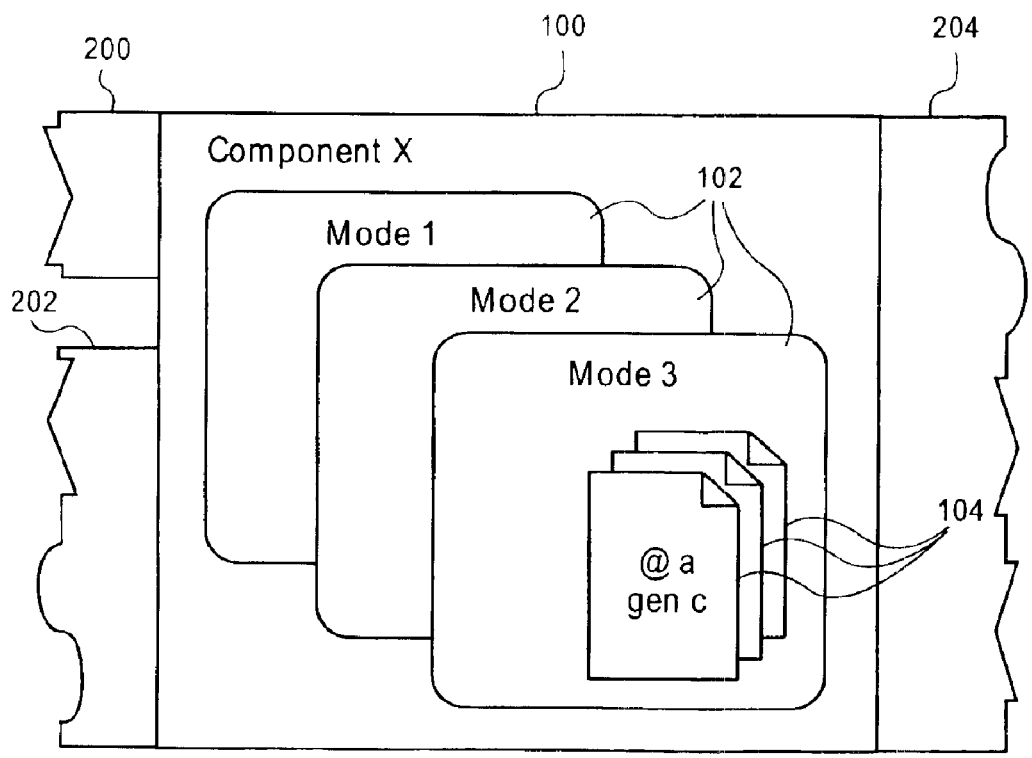
FIG. 2 is the component of FIG. 1 further having a set of coordination interfaces.

FIG. 2 is component 100 further including a first coordination interface 200, a second coordination interface 202, and a third coordination interface 204. Coordination-centric design's components 100 provide the code-sharing capability of object-oriented inheritance through copying. Another aspect of object-oriented inheritance is polymorphism through shared interfaces. In object-oriented languages, an object's interface is defined by its methods. Although coordination-centric design's actions 104 are similar to methods in object-oriented languages, they do not define the interface for component 100. Components interact through explicit and separate coordination interfaces, in this figure coordination interfaces 200, 202, and 204. The shape of coordination interfaces 200, 202, and 204 determines the ways in which component 100 may be connected within a software system. The way coordination interfaces 200, 202, and 204 are connected to modes 102 and actions 104 within component 100 determines how the behavior of component 100 can be managed within a system. Systemwide behavior is managed through coordinators (see FIG. 4B and subsequent).

For our approach to be effective, several factors in the design of software elements must coincide: packaging, internal organization, and how elements coordinate their behavior. Although these are often treated as independent issues, conflicts among them can exacerbate debugging. We handle them in a unified framework that separates the internal activity from the external relationship of component 100. This lets designers build more modular components and encourages them to specify distributable versions of coordination protocols. Components can be reused in a variety of contexts, both distributed, and single processor 1.

1. Introduction to Coordination

Within this application, coordination refers to the predetermined ways by which components interact. Consider a common coordination activity: resource allocation. One simple protocol for this is round-robin: participants are lined up, and the resource is given to each participant in turn. After the last participant is served, the resource is given back to the first. There is a resource-scheduling period during which each participant gets the resource exactly once, whether or not it is needed.

Figure 3A:
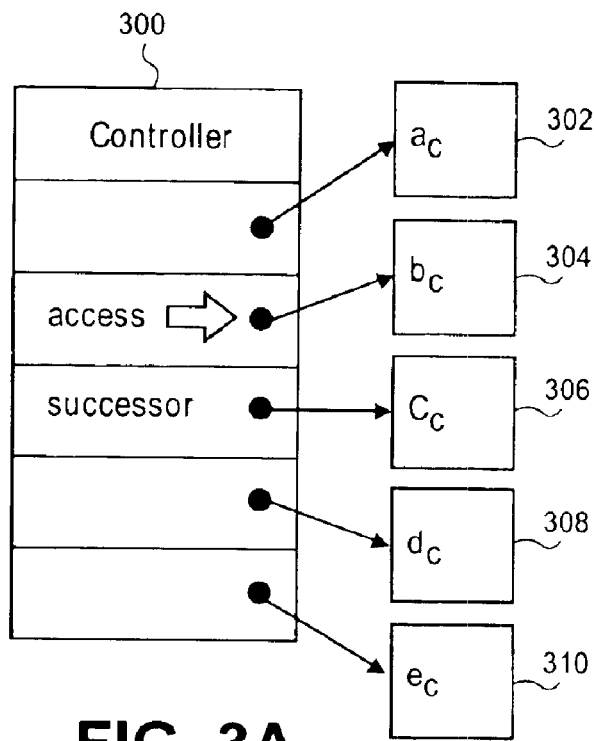
FIG. 3A is a prior art round-robin resource allocation protocol with a centralized controller.

FIG. 3A is prior art round-robin resource allocation protocol with a centralized controller 300, which keeps track of and distributes the shared resource (not shown) to each of software elements 302, 304, 306, 308, and 310 in turn. With reference to FIG. 3A, controller 300 alone determines which software element 302, 304, 306, 308, or 310 is currently allowed to use the resource and which has it next. This implementation of a round-robin protocol permits software elements 302, 304, 306, 308, and 310 to be modular, because only controller 300 keeps track of the software elements. Unfortunately, when this implementation is implemented on a distributed architecture (not shown), controller 300 must typically be placed on a single processing element (not shown). As a result, all coordination requests must go through that processing element, which can cause a communication performance bottleneck. For example, consider the situation in which software elements 304 and 306 are implemented on a first processing element (not shown) and controller 300 is implemented on a second processing element. Software element 304 releases the shared resource and must send a message indicating this to controller 300. Controller 300 must then send a message to software element 306 to inform software element 306 that it now has the right to the shared resource. If the communication channel between the first processing resource and the second processing resource is in use or the second processing element is busy, then the shared resource must remain idle, even though both the current resource holder and the next resource holder (software elements 304 and 306 respectively) are implemented on the first processing element (not shown). The shared resource must typically remain idle until communication can take place and controller 300 can respond. This is an inefficient way to control access to a shared resource.

Figure 3B:
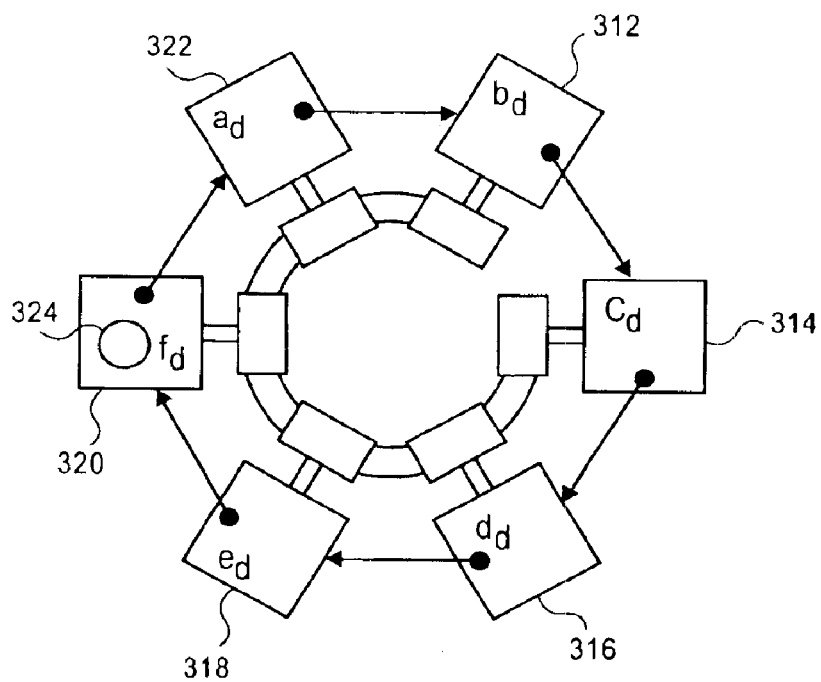
FIG. 3B is a prior art round-robin resource allocation protocol implementing a token passing scheme.

FIG. 3B is a prior art round-robin resource allocation protocol implementing a token passing scheme. With reference to FIG. 3B, this system consists of a shared resource 311 and a set of software elements 312, 314, 316, 318, 320, and 322. In this system a logical token 324 symbolizes the right to access resource 311, i.e., when a software element holds token 324, it has the right to access resource 311. When one of software elements 312, 314, 316, 318, 320, or 322 finishes with resource 311, it passes token 324, and with token 324 the access right, to a successor. This implementation can be distributed without a centralized controller, but as shown in FIG. v3B, this is less modular, because it requires each software element in the set to keep track of a successor.

Not only must software elements 312, 314, 316, 318, 320, and 322 keep track of successors, but each must implement a potentially complicated and error-prone protocol for transferring token 324 to its successor. Bugs can cause token 324 to be lost or introduce multiple tokens 324. Since there is no formal connection between the physical system and complete topology maps (diagrams that show how each software element is connected to others within the system), some software elements might erroneously be serviced more than once per cycle, while others are completely neglected. However, these bugs can be extremely difficult to track after the system is completed. The protocol is entangled with the functionality of each software element, and it is difficult to separate the two for debugging purposes. Furthermore, if a few of the software elements are located on the same machine, performance of the implementation can be poor. The entangling of computation and coordination requires intrusive modification to optimize the system.

2. Coordination-Centric Design's Approach to Coordination

The coordination-centric design methodology provides an encapsulating formalism for coordination. Components such as component 100 interact using coordination interfaces, such as first, second, and third coordination interfaces 200, 202, and 204, respectively. Coordination interfaces preserve component modularity while exposing any parts of a component that participate in coordination. This technique of connecting components provides polymorphism in a similar fashion to subtyping in object-oriented languages.

Figure 4A:
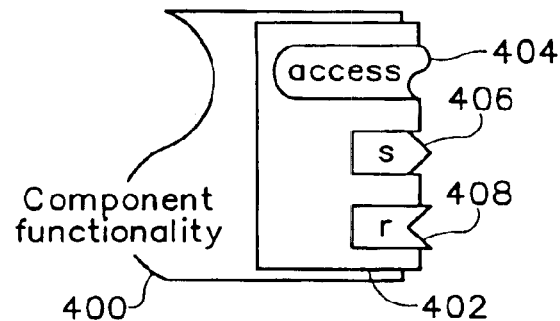
FIG. 4A is a detailed view of a component and a coordination interface connected to the component for use in round-robin resource allocation in accordance with the present invention.

FIG. 4A is a detailed view of a component 400 and a resource access coordination interface 402 connected to component 400 for use in a round-robin coordination protocol in accordance with the present invention. With reference to FIG. 4A, resource access coordination interface 402 facilitates implementation of a round-robin protocol that is similar to the token-passing round-robin protocol described above. Resource access coordination interface 402 has a single bit of control state, called access, which is shown as an arbitrated control port 404 that indicates whether or not component 400 is holding a virtual token (not shown). Component 400 can only use a send message port 406 on access coordination interface 402 when arbitrated control port 404 is true. Access coordination interface 402 further has a receive message port 408.

Figure 4B:
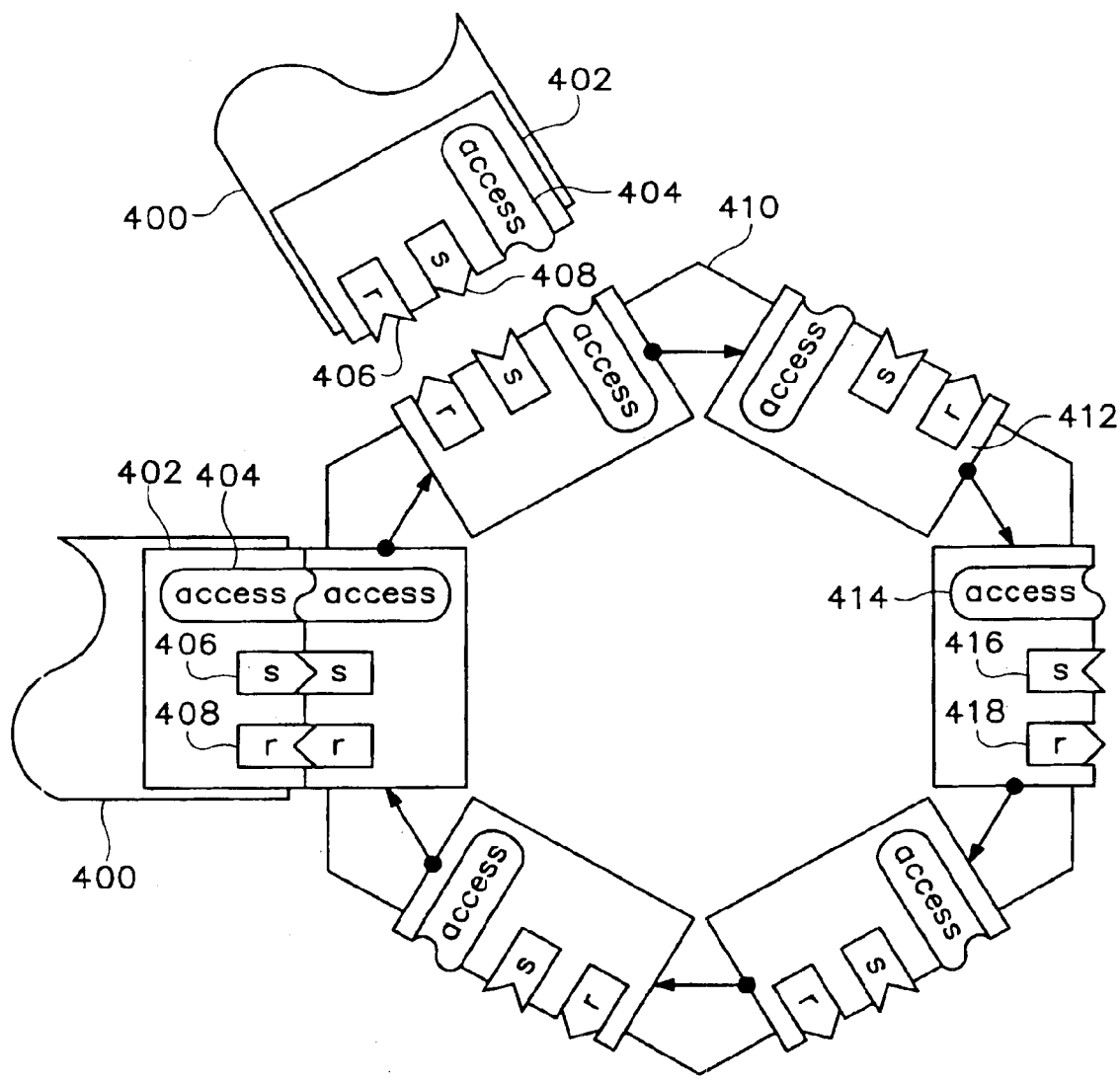
FIG. 4B depicts a round-robin coordinator in accordance with the present invention.

FIG. 4B show a round-robin coordinator 410 in accordance with the present invention. With reference to FIG. 4B, round-robin coordinator 410 has a set of coordinator coordination interfaces 412 for connecting to a set of components 400. Each component 400 includes a resource access coordination interface 402. Each coordinator coordination interface 412 has a coordinator arbitrated control port 414, an incoming send message port 416 and an outgoing receive message port 418. Coordinator coordination interface 412 in complimentary to resource access coordination interface 402, and vice versa, because the ports on the two interfaces are compatible and can function to transfer information between the two interfaces.

The round-robin protocol requires round-robin coordinator 410 to manage the coordination topology. Round-robin coordinator 410 is an instance of more general abstractions called coordination classes, in which coordination classes define specific coordination protocols and a coordinator is a specific implementation of the coordination class. Round-robin coordinator 410 contains all information about how components 400 are supposed to coordinate. Although round-robin coordinator 410 can have a distributed implementation, no component 400 is required to keep references to any other component 400 (unlike the distributed round-robin implementation shown in FIG. 3B). All required references are maintained by round-robin coordinator 410 itself, and components 400 do not even need to know that they are coordinating through round-robin. Resource access coordination interface 402 can be used with any coordinator that provides the appropriate complementary interface. A coordinator's design is independent of whether it is implemented on a distributed platform or on a monolithic single processor platform.

3. Coordination Interfaces

Coordination interfaces are used to connect components to coordinators. They are also the principle key to a variety of useful runtime debugging techniques. Coordination interfaces support component modularity by exposing all parts of the component that participate in the coordination protocol. Ports are elements of coordination interfaces, as are guarantees and requirements, each of which will be described in turn.

A. Ports

A port is a primitive connection point for interconnecting components. Each port is a five-tuple (T; A; Q; D; R) in which:

T represents the data type of the port. T can be one of int, boolean, char, byte, float, double, or cluster, in which cluster represents a cluster of data types (e.g., an int followed by a float followed by two bytes).

A is a boolean value that is true if the port is arbitrated and false otherwise.

Q is an integer greater than zero that represents logical queue depth for a port.

D is one of in, out, inout, or custom and represents the direction data flows with respect to the port.

R is one of discard-on-read, discard-on-transfer, or hold and represents the policy for data removal on the port. Discard-on-read indicates that data is removed immediately after it is read (and any data in the logical queue are shifted), discard-on-transfer indicates that data is removed from a port immediately after being transferred to another port, and hold indicates that data should be held until it is overwritten by another value. Hold is subject to arbitration.

Figure 5:
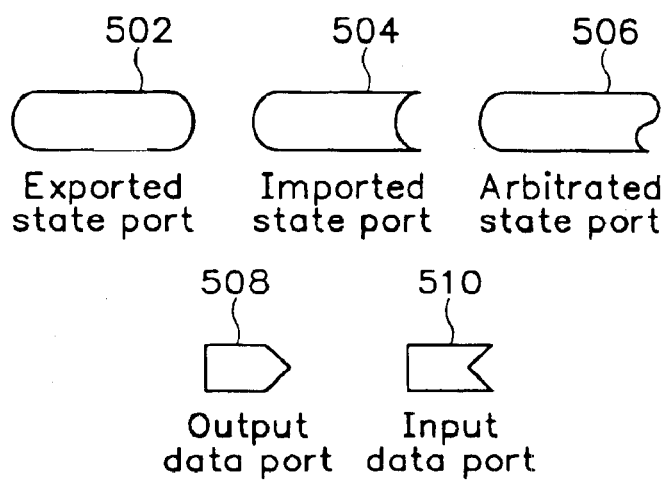
FIG. 5 shows several typical ports for use in a coordination interface in accordance with the present invention.

Custom directionality allows designers to specify ports that accept or generate only certain specific values. For example, a designer may want a port that allows other components to activate, but not deactivate, a mode. While many combinations of port attributes are possible, we normally encounter only a few. The three most common are message ports (output or input), state ports (output, input, or both; sometimes arbitrated), and control ports (a type of state port). FIG. 5 illustrates the visual syntax used for several common ports throughout this application. With reference to FIG. 5, this figure depicts an exported state port 502, an imported state port 504, an arbitrated state port 506, an output data port 508, and an input data port 510.

1. Message Ports

Message ports (output and input) data ports 508 and 510 respectively) are either send (T; false; 1; out; discard-on-transfer) or receive (T; false; Q; in; discard-on-read). Their function is to transfer data between components. Data passed to a send port is transferred immediately to the corresponding receive port, thus it cannot be retrieved from the send port later. Receive data ports can have queues of various depths. Data arrivals on these ports are frequently used to trigger and pass data parameters into actions. Values remain on receive ports until they are read.

2. State Ports

State ports take one of three forms:
1. (T; false; 1; out; hold)
2. (T; false; 1; in; hold)
3. (T; true; 1; inout; hold)

State ports, such as exported state port 502, imported state port 504, and arbitrated state port 506, hold persistent values, and the value assigned to a state port may be arbitrated. This means that, unlike message ports, values remain on the state ports until changed. When multiple software elements simultaneously attempt to alter the value of arbitrated state port 506, the final value is determined based on arbitration rules provided by the designer through an arbitration coordinator (not shown).

State ports transfer variable values between scopes, as explained below. In coordination-centric design, all variables referenced by a component are local to that component, and these variables must be explicitly declared in the component's scope. Variables can, however, be bound to state ports that are connected to other components. In this way a variable value can be transferred between components and the variable value achieves the system-level effect of a multivariable.

3. Control Ports

Control ports are similar to state ports, but a control port is limited to having the boolean data type. Control ports are typically bound to modes. Actions interact with a control port indirectly, by setting and responding to the values of a mode that is bound to the control port.

For example, arbitrated control port 404 shown in FIG. 4A is a control port that can be bound to a mode (not shown) containing all actions that send data on a shared channel. When arbitrated control port 404 is false, the mode is inactive, disabling all actions that send data on the channel.

B. Guarantees

Guarantees are formal declarations of invariant properties of a coordination interface. There can be several types of guarantees, such as timing guarantees between events, guarantees between control state (e.g., state A and state B are guaranteed to be mutually exclusive), etc. Although a coordination interface's guarantees reflect properties of the component to which the coordination interface is connected, the guarantees are not physically bound to any internal portions of the component. Guarantees can often be certified through static analysis of the software system. Guarantees are meant to cache various properties that are inherent in a component or a coordinator in order to simplify static analysis of the software system.

A guarantee is a promise provided by a coordination interface. The guarantee takes the form of a predicate promised to be invariant. In principle, guarantees can include any type of predicate (e.g., x>3, in which x is an integer valued state port, or $t_{ea}-t_{eb}<2$ ms). Throughout the remainder of this application, guarantees will be only event-ordering guarantees (guarantees that specify acceptable orders of events) or control-relationship guarantees (guarantees pertaining to acceptable relative component behaviors).

C. Requirements

A requirement is a formal declaration of the properties necessary for correct software system functionality. An example of a requirement is a required response time for a coordination interface—the number of messages that must have arrived at the coordination interface before the coordination interface can transmit, or fire, the messages. When two coordination interfaces are bound together, the requirements of the first coordination interface must be conservatively matched by the guarantees of the second coordination interface (e.g., x<7 as a guarantee conservatively matches x<8 as a requirement). As with guarantees, requirements are not physically bound to anything within the component itself. Guarantees can often be verified to be sufficient for the correct operation of the software system in which the component is used. In sum, a requirement is a predicate on a first coordination interface that must be conservatively matched with a guarantee on a complementary second coordination interface.

D. Conclusion Regarding Coordination Interfaces

A coordination interface is a four-tuple (P; G; R; I) in which:

P is a set of named ports.

G is a set of named guarantees provided by the interface.

R is a set of named requirements that must be matched by guarantees of connected interfaces.

I is a set of named coordination interfaces.

As this definition shows, coordination interfaces are recursive. Coordinator coordination interface 412, shown in FIG. 4B, used for round-robin coordination is called Access-Interface and is defined in Table 1.

| Constituent | Value |
| --- | --- |
| ports | P = { access:StatePort, s:outMessagePort, r:inMessagePort } |
| guarantees | G = { ¬ access ⇒ ¬ s.gen } |
| requirements | R = Ø |
| interfaces | I = Ø |

Related to coordination interfaces is a recursive coordination interface descriptor, which is a five-tuple ($P_a$; $G_a$; $R_a$; $I_d$; $N_d$) in which:

$P_a$ is a set of abstract ports, which are ports that may be incomplete in their attributes (i.e., they do not yet have a datatype).

$G_a$ is a set of abstract guarantees, which are guarantees between abstract ports.

$R_a$ is a set of abstract requirements, which are requirements between abstract ports.

$I_d$ is a set of coordination interface descriptors.

$N_d$ is an element of Q×Q, where Q={∞}∪Z+ and Z+ denotes the set of positive integers. $N_d$ indicates the number or range of numbers of permissible interfaces (e.g., [2], [2, 30], etc.).

Allowing coordination interfaces to contain other coordination interfaces is a powerful feature. It lets designers use common coordination interfaces as complex ports within other coordination interfaces. For example, the basic message ports described above are nonblocking, but we can build a blocking coordination interface (not shown) that serves as a blocking port by combining a wait state port with a message port.

4. Coordinators

A coordinator provides the concrete representations of intercomponent aspects of a coordination protocol. Coordinators allow a variety of static analysis debugging methodologies for software systems created with the coordination-centric design methodology. A coordinator contains a set of coordination interfaces and defines the relationships the coordination interfaces. The coordination interfaces complement the component coordination interfaces provided by components operating within the protocol. Through matched interface pairs, coordinators effectively describe connections between message ports, correlations between control states, and transactions between components.

For example, round-robin coordinator 410, shown in FIG. 4B, must ensure that only one component 400 has its component control port 404's value, or its access bit, set to true. Round-robin coordinator 410 must further ensure that the correct component 400 has its component control port 404 set to true for the chosen sequence. This section presents formal definitions of the parts that comprise coordinators: modes, actions, bindings, action triples, and constraints. These definitions culminate in a formal definition of coordinators.

A. Modes

A mode is a boolean value that can be used as a guard on an action. In a coordinator, the mode is most often bound to a control port in a coordination interface for the coordinator. For example, in round-robin coordinator 410, the modes of concern are bound to a coordinator control port 414 of each coordinator coordination interface 412.

B. Actions

An action is a primitive behavioral element that can:

Respond to events.

Generate events.

Change modes.

Actions can range in complexity from simple operations up to complicated pieces of source code. An action in a coordinator is called a transparent action because the effects of the action can be precomputed and the internals of the action are completely exposed to the coordination-centric design tools.

C. Bindings

Bindings connect input ports to output ports, control ports to modes, state ports to variables, and message ports to events. Bindings are transparent and passive. Bindings are simply conduits for event notification and data transfer. When used for event notification, bindings are called triggers.

D. Action Triples

To be executed, an action must be enabled by a mode and triggered by an event. The combination of a mode, trigger, and action is referred to as an action triple, which is a triple (m; t; a) in which:

m is a mode.

t is a trigger.

a is an action.

The trigger is a reference to an event type, but it can be used to pass data into the action. Action triples are written: mode: trigger: action A coordinator's actions are usually either pure control, in which both the trigger and action performed affect only control state, or pure data, in which both the trigger and action performed occur in the data domain. In the case of round-robin coordinator 410, the following set of actions is responsible for maintaining the appropriate state:

$$access_i :-access_i; +access_{(i+1)} \bmod n$$

The symbol "+" signifies a mode's activation edge (i.e., the event associated with the mode becoming true), and the symbol "−" signifies its deactivation edge. When any coordinator coordination interface 412 deactivates its arbitrated control port 404's, access bit, the access bit of the next coordinator coordination interface 412 is automatically activated.

E. Constraints

In this dissertation, constraints are boolean relationships between control ports. They take the form:

$$\text{Condition} \Rightarrow \text{Effect}$$

This essentially means that the Condition (on the left side of the arrow) being true implies that Effect (on the right side of the arrow) is also true. In other words, if Condition is true, then Effect should also be true.

A constraint differs from a guarantee in that the guarantee is limited to communicating in-variant relationships between components without providing a way to enforce the in-variant relationship. The constraint, on the other hand, is a set of instructions to the runtime system dealing with how to enforce certain relationships between components. When a constraint is violated, two corrective actions are available to the system: (1) modify the values on the left-hand side to make the left-hand expression evaluate as false (an effect termed backpressure) or (2) alter the right-hand side to make it true. We refer to these techniques as LHM (left-hand modify) and RHM (right-hand modify). For example, given the constraint $x \Rightarrow \neg y$ and the value x·y, with RHM semantics the runtime system must respond by disabling y or setting y to false. Thus the value of $\neg y$ is set to true.

The decision of whether to use LHM, to use RHM, or even to suspend enforcement of a constraint in certain situations can dramatically affect the efficiency and predictability of the software system. Coordination-centric design does not attempt to solve simultaneous constraints at runtime. Rather, runtime algorithms use local ordered constraint solutions. This, however, can result in some constraints being violated and is discussed further below.

Round-robin coordinator 410 has a set of safety constraints to ensure that there is never more than one token in the system:

$$access_i \Rightarrow \forall_{j \neq i} \neg access_j$$

The above equation translates roughly as $access_i$ implies not $access_j$ for the set of all $access_j$ where j is not equal to i. Even this simple constraint system can cause problems with local resolution semantics (as are LHM and RHM). If the runtime system attempted to fix all constraints simultaneously, all access modes would be shut down. If they were fixed one at a time, however, any duplicate tokens would be erased on the first pass, satisfying all other constraints and leaving a single token in the system.

Since high-level protocols can be built from combinations of lower-level protocols, coordinators can be hierarchically composed. A coordinator is a six-tuple (I; M; B; N; A; X) in which:

I is a set of coordination interfaces.

M is a set of modes.

B is a set of bindings between interface elements (e.g., control ports and message ports) and internal elements (e.g., modes and triggers).

N is a set of constraints between interface elements.

A is a set of action triples for the coordinator.

X is a set of subcoordinators.

Figure 6A:
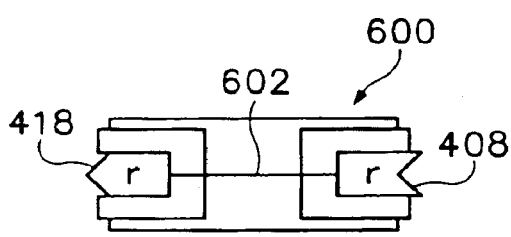
FIG. 6A is a unidirectional data transfer coordinator in accordance with the present invention.
Figure 6B:
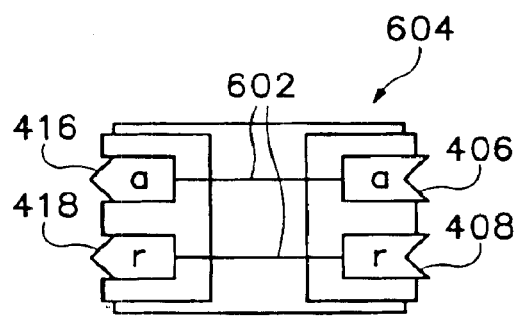
FIG. 6B is a bidirectional data transfer coordinator in accordance with the present invention.

FIGS. 6A, 6B, 6C, and 6D show a few simple coordinators highlighting the bindings and constraints of the respective coordinators. With reference to FIG. 6A, a unidirectional data transfer coordinator 600 transfers data in one direction between two components (not shown) by connecting incoming receive message port 408 to outgoing receive message port 418 with a binding 602. With reference to FIG. 6B, bidirectional data transfer coordinator 604 transfers data back and forth between two components (not shown) by connecting incoming receive message port 408 to outgoing receive message port 418 with binding 602 and connecting send message port 406 to incoming send message port 416 with a second binding 602. Unidirectional data transfer coordinator 600 and bidirectional data transfer coordinator 604 simply move data from one message port to another. Thus each coordinator consists of bindings between corresponding ports on separate coordination interfaces.

Figure 6C:
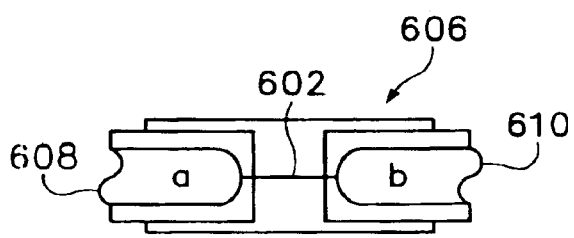
FIG. 6C is a state unification coordinator in accordance with the present invention.
Figure 6D:
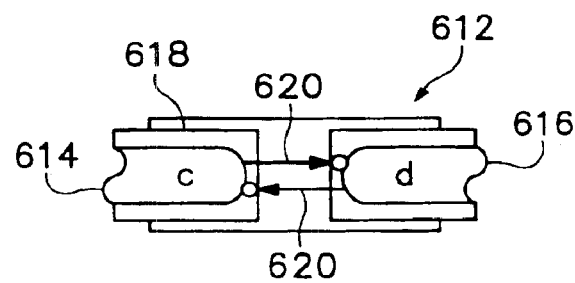
FIG. 6D is a control state mutex coordinator in accordance with the present invention.

With reference to FIG. 6C, state unification coordinator 606 ensures that a state port a 608 and a state port b 610 are always set to the same value. State unification coordinator 606 connects state port a 608 to state port b 610 with binding 602. With reference to FIG. 6D, control state mutex coordinator 612 has a first constraint 618 and a second constraint 620 as follows:

$$c \Rightarrow \neg d \text{ and} \quad (1)$$

$$d \Rightarrow \neg c. \quad (2)$$

Constraints 618 and 620 can be restated as follows:

(1) A state port c 614 having a true value implies that a state port d 616 has a false value, and (2) State port d 616 having a true value implies that state port c 614 has a false value.

A coordinator has two types of coordination interfaces: up interfaces that connect the coordinator to a second coordinator, which is at a higher level of design hierarchy and down interfaces that connect the coordinator either to a component or to a third coordinator, which is at a lower level of design hierarchy. Down interfaces have names preceded with "~". Round-robin coordinator 410 has six down coordination interfaces (previously referred to as coordinator coordination interface 412), with constraints that make the turning off of any coordinator control port 414 (also referred to as access control port) turn on the coordinator control port 414 of the next coordinator coordination interface 412 in line. Table 2 presents all constituents of the round-robin coordinator.

| Constituent | Value |
| --- | --- |
| coordination interfaces | I = AccessInterface$_{1-6}$ |
| modes | M = access$_{1-6}$ |
| bindings | B = ∀ $_{1 \leq i \leq 6}$(~AccessInterface$_i$.access, access$_i$) ∪ |
| constraints | N = ∀ $_{1 \leq i \leq 6}$(∀$_{(1 \leq j \leq 6) \wedge (i \neq j)}$access$_i$ ⇒ ¬ access$_j$) |
| actions | A = ∀ $_{1 \leq i \leq 6}$ access$_i$: −access$_i$: +access$_{(i+1)}$ mod 6 |
| subcoordinators | X = ∅ |

This tuple describes an implementation of a round-robin coordination protocol for a particular system with six components, as shown in round-robin coordinator 410. We use a coordination class to describe a general coordination protocol that may not have a fixed number of coordinator coordination interfaces. The coordination class is a six-tuple (Ic; Mc; Bc; Nc; Ac; Xc) in which:

Ic is a set of coordination interface descriptors in which each descriptor provides a type of coordination interface and specifies the number of such interfaces allowed within the coordination class.

Mc is a set of abstract modes that supplies appropriate modes when a coordination class is instantiated with a fixed number of coordinator coordination interfaces.

Bc is a set of abstract bindings that forms appropriate bindings between elements when the coordination class is instantiated.

Nc is a set of abstract constraints that ensures appropriate constraints between coordination interface elements are in place as specified at instantiation.

Ac is a set of abstract action triples for the coordinator.

Xc is a set of coordination classes (hierarchy).

While a coordinator describes coordination protocol for a particular application, it requires many aspects, such as the number of coordination interfaces and datatypes, to be fixed. Coordination classes describe protocols across many applications. The use of the coordination interface descriptors instead of coordination interfaces lets coordination classes keep the number of interfaces and datatypes undetermined until a particular coordinator is instantiated. For example, a round-robin coordinator contains a fixed number of coordinator coordination interfaces with specific bindings and constraints between the message and state ports on the fixed number of coordinator coordination interfaces. A round-robin coordination class contains descriptors for the coordinator coordination interface type, without stating how many coordinator coordination interfaces, and instructions for building bindings and constraints between ports on the coordinator coordination interfaces when a particular round-robin coordinator is created.

5. Components

A component is a six-tuple (I; A; M; V; S; X) in which:

I is a set of coordination interfaces.

A is a set of action triples.

M is a set of modes.

V is a set of typed variables.

S is a set of subcomponents.

X is a set of coordinators used to connect the subcomponents to each other and to the coordination interfaces.

Actions within a coordinator are fairly regular, and hence a large number of actions can be described with a few simple expressions. However, actions within a component are frequently diverse and can require distinct definitions for each individual action. Typically a component's action triples are represented with a table that has three columns: one for the mode, one for the trigger, and one for the action code. Table 3 shows some example actions from a component that can use round-robin coordination.

| Mode | Trigger | Action |
| --- | --- | --- |
| access | tick | AccessInterface.s.send("Test message"); −access; |
| ¬ access | tick | waitCount ++; |

A component resembles a coordinator in several ways (for example, the modes and coordination interfaces in each are virtually the same). Components can have internal coordinators, and because of the internal coordinators, components do not always require either bindings or constraints. In the following subsections, various aspects of components are described in greater detail. Theses aspects of components include variable scope, action transparency, and execution semantics for systems of actions.

A. Variable Scope

To enhance a component's modularity, all variables accessed by an action within the component are either local to the action, local to the immediate parent component of the action, or accessed by the immediate parent component of the action via state ports in one of the parent component's coordination interfaces. For a component's variables to be available to a hierarchical child component, they must be exported by the component and then imported by the child of the component.

B. Action Transparency

An action within a component can be either a transparent action or an opaque action. Transparent and opaque actions each have different invocation semantics. The internal properties, i.e. control structures, variable, changes in state, operators, etc., of transparent actions are visible to all coordination-centric design tools. The design tools can separate, observe, and analyze all the internal properties of opaque actions. Opaque actions are source code. Opaque actions must be executed directly, and looking at the internal properties of opaque actions can be accomplished only through traditional, source-level debugging techniques. An opaque action must explicitly declare any mode changes and coordination interfaces that the opaque action may directly affect.

C. Action Execution

An action is triggered by an event, such as data arriving or departing a message port, or changes in value being applied to a state port. An action can change the value of a state port, generate an event, and provide a way for the software system to interact with low-level device drivers. Since actions typically produce events, a single trigger can be propagated through a sequence of actions.

6. Protocols Implemented with Coordination Classes

In this section, we describe several coordinators that individually implement some common protocols: subsumption, barrier synchronization, rendezvous, and dedicated RPC.

A. Subsumption Protocol

A subsumption protocol is a priority-based, preemptive resource allocation protocol commonly used in building small, autonomous robots, in which the shared resource is the robot itself.

Figure 7:
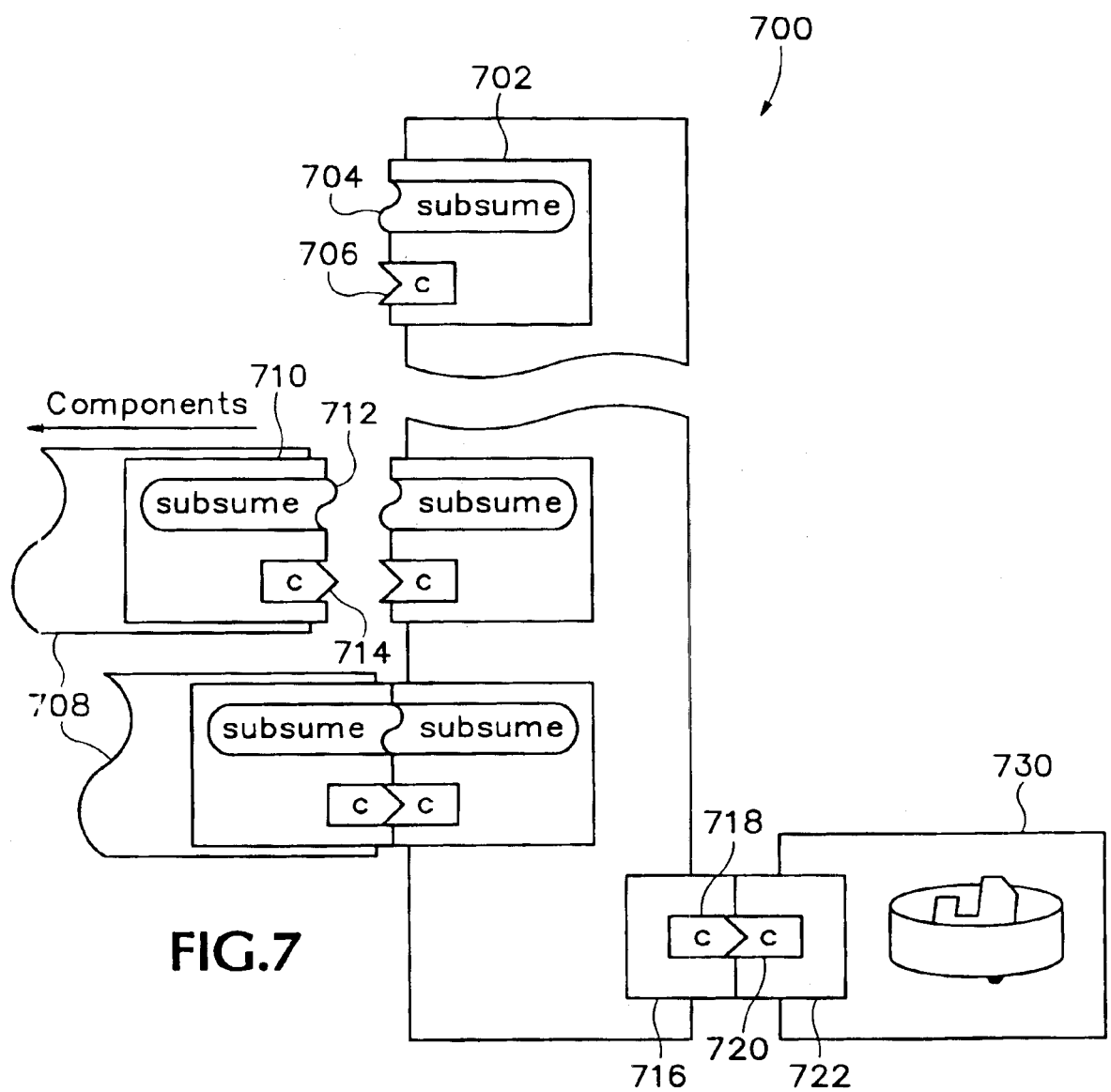
FIG. 7 is a system for implementing subsumption resource allocation having components, a shared resource, and a subsumption coordinator.

FIG. 7 shows a set of coordination interfaces and a coordinator for implementing the subsumption protocol. With reference to FIG. 7, a subsumption coordinator 700 has a set of subsumption coordinator coordination interfaces 702, which have a subsume arbitrated coordinator control port 704 and an incoming subsume message port 706. Each subsume component 708 has a subsume component coordination interface 710. Subsume component coordination interface 710 has a subsume arbitrated component control port 712 and an outgoing subsume message port 714. Subsumption coordinator 700 and each subsume component 708 are connected by their respective coordination interfaces, 702 and 710. Each subsumption coordinator coordination interface 702 in subsumption coordinator 700 is associated with a priority. Each subsume component 708 has a behavior that can be applied to a robot (not shown). At any time, any subsume component 708 can attempt to assert its behavior on the robot. The asserted behavior coming from the subsume component 708 connected to the subsumption coordinator coordination interface 702 with the highest priority is the asserted behavior that will actually be performed by the robot. Subsume components 708 need not know anything about other components in the system. In fact, each subsume component 708 is designed to perform independently of whether their asserted behavior is performed or ignored.

Subsumption coordinator 700 further has a slave coordinator coordination interface 716, which has an outgoing slave message port 718. Outgoing slave message port 718 is connected to an incoming slave message port 720. Incoming slave message port 720 is part of a slave coordination interface 722, which is connected to a slave 730. When a subsume component 708 asserts a behavior and that component has the highest priority, subsumption coordinator 700 will control slave 730 (which typically controls the robot) based on the asserted behavior.

The following constraint describes the basis of the subsumption coordinator 700's behavior:

$$subsume_p \Rightarrow \bigwedge_{i=1}^{p-1} \neg subsume_i$$

This means that if any subsume component 708 has a subsume arbitrated component control port 712 that has a value of true, then all lower-priority subsume arbitrated component control ports 712 are set to false. An important difference between round-robin and subsumption is that in round-robin, the resource access right is transferred only when surrendered. Therefore, round-robin coordination has cooperative release semantics. However, in subsumption coordination, a subsume component 708 tries to obtain the resource whenever it needs to and succeeds only when it has higher priority than any other subsume component 708 that needs the resource at the same time. A lower-priority subsume component 708 already using the resource must surrender the resource whenever a higher-priority subsume component 708 tries to access the resource. Subsumption coordination uses preemptive release semantics, whereby each subsume component 708 must always be prepared to relinquish the resource.

Table 4 presents the complete tuple for the subsumption coordinator.

| Constituent | Value |
|---|---|
| coordination interfaces | I = (Subsume$_{1-n}$) ∪ (Output) |
| modes | M = subsume$_{1-n}$ |
| bindings | B = ∀ $_{1 \le i \le n}$(Subsume$_i$.subsume, subsume$_i$) ∪ |
| constraints | N = ∀ $_{1 \le i \le n}$(∀$_{(1 \le j \le i)}$ subsume$_i$ ⇒ ¬subsume$_j$) |
| actions | A = ∅ |
| subcoordinators | X = ∅ |

B. Barrier Synchronization Protocol

Other simple types of coordination that components might engage in enforce synchronization of activities. An example is barrier synchronization, in which each component reaches a synchronization point independently and waits. FIG. 8 depicts a barrier synchronization coordinator 800. With reference to FIG. 8, barrier synchronization coordinator 800 has a set of barrier synchronization coordination interfaces 802, each of which has a coordinator arbitrated state port 804, named wait. Coordinator arbitrated state port 804 is connected to a component arbitrated state port 806, which is part of a component coordination interface 808. Component coordination interface 808 is connected to a component 810. When all components 810 reach their respective synchronization points, they are all released from waiting. The actions for a barrier synchronization coordinator with n interfaces are:

$$\bigwedge_{0 \le i < n} wait_i : : \forall_{0 \le j < n} -wait_j$$

In other words, when all wait modes (not shown) become active, each one is released. The blank between the two colons indicates that the trigger event is the guard condition becoming true.

C. Rendezvous Protocol

A resource allocation protocol similar to barrier synchronization is called rendezvous. FIG. 9 depicts a rendezvous coordinator 900 in accordance with the present invention. With reference to FIG. 9, rendezvous coordinator 900 has a rendezvous coordination interface 902, which has a rendezvous arbitrated state port 904. A set of rendezvous components 906, each of which may perform different functions or have vastly different actions and modes, has a rendezvous component coordination interface 908, which includes a component arbitrated state port 910. Rendezvous components 906 connect to rendezvous coordinator 900 through their respective coordination interfaces, 908 and 902. Rendezvous coordinator 900 further has a rendezvous resource coordination interface 912, which has a rendezvous resource arbitrated state port 914, also called available. A resource 916 has a resource coordination interface 918, which has a resource arbitrated state port 920. Resource 916 is connected to rendezvous coordinator 900 by their complementary coordination interfaces, 918 and 912 respectively.

With rendezvous-style coordination, there are two types of participants: resource 916 and several resource users, here rendezvous components 916. When resource 916 is available, it activates its resource arbitrated state port 920, also referred to as its available control port. If there are any waiting rendezvous components 916, one will be matched with the resource; both participants are then released. This differs from subsumption and round-robin in that resource 916 plays an active role in the protocol by activating its available control port 920.

The actions for rendezvous coordinator 900 are:

available$_i$ wait$_j$::−available$_i$, −wait$_j$

This could also be accompanied by other modes that indicate the status after the rendezvous. With rendezvous coordination, it is important that only one component at a time be released from wait mode.

D. Dedicated RPC Protocol

Figure 10:
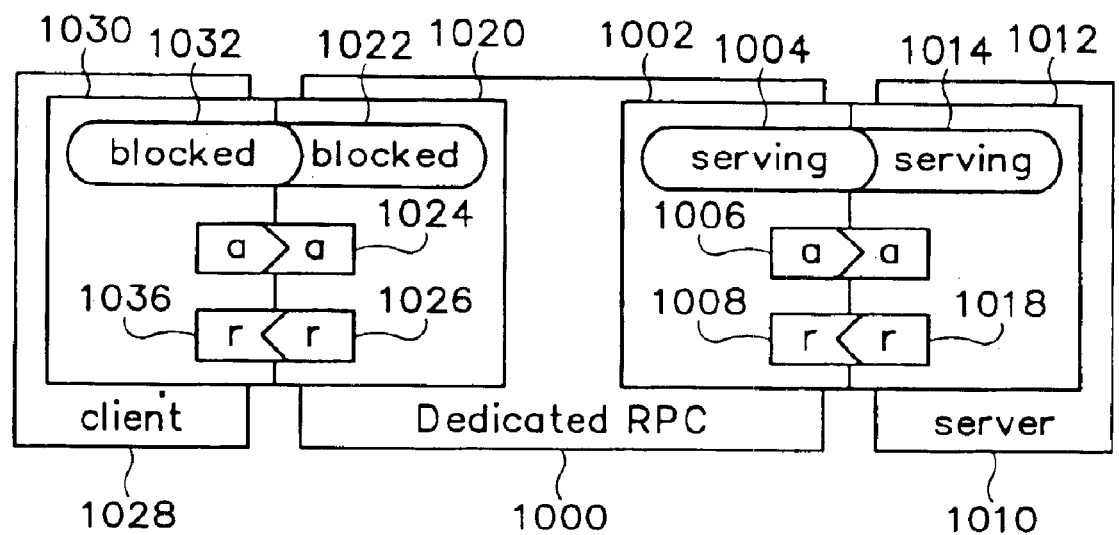
FIG. 10 depicts a dedicated RPC system having a client, a server, and a dedicated RPC coordinator coordinating the activities of the client and the server.

A coordination class that differs from those described above is dedicated RPC. FIG. 10 depicts a dedicated RPC system. With reference to FIG. 10, a dedicated RPC coordinator 1000 has an RPC server coordination interface 1002, which includes an RPC server imported state port 1004, an RPC server output message port 1006, and an RPC server input message port 1008. Dedicated RPC coordinator 1000 is connected to a server 1010. Server 1010 has a server coordination interface 1012, which has a server exported state port 1014, a server input data port 1016, and a server output data port 1018. Dedicated RPC coordinator 1000 is connected to server 1010 through their complementary coordination interfaces, 1002 and 1012 respectively. Dedicated RPC coordinator 1000 further has an RPC client coordination interface 1020, which includes an RPC client imported state port 1022, an RPC client input message port 1024, and an RPC client output message port 1026. Dedicated RPC coordinator 1000 is connected to a client 1028 by connecting RPC client coordination interface 1020 to a complementary client coordination interface 1030. Client coordination interface 1030 has a client exported state port 1032, a client output message port 1034, and a client input message port 1036.

The dedicated RPC protocol has a client/server protocol in which server 1010 is dedicated to a single client, in this case client 1028. Unlike the resource allocation protocol examples, the temporal behavior of this protocol is the most important factor in defining it. The following transaction listing describes this temporal behavior:

Client 1028 enters blocked mode by changing the value stored at client exported state port 1032 to true.

Client 1028 transmits an argument data message to server 1010 via client output message port 1034.

Server 1010 receives the argument (labeled "a") data message via server input data port 1016 and enters serving mode by changing the value stored in server exported state port 1014 to true.

Server 1010 computes return value.

Server 1010 transmits a return (labeled "r") message to client 1020 via server output data port 1018 and exits serving mode by changing the value stored in server exported state port 1014 to false.

Client 1028 receives the return data message via client input message port 1036 and exits blocked mode by changing the value stored at client exported state port 1032 to false.

This can be presented more concisely with an expression describing causal relationships:

$$T_{RPC} = +client.blocked \to client.transmits \to$$
$$+server.serving \to server.transmits \to$$
$$(-server.serving \parallel client.receives) \to -client.blocked$$

The transactions above describe what is supposed to happen. Other properties of this protocol must be described with temporal logic predicates.

server.serving ⇒client.blocked server.serving ⇒F (server.r.output)

server.a.input ⇒F(server.serving)

The r in server.r.output refers to the server output data port 1018, also labeled as the r event port on the server, and the a in serving.a.input refers to server input data port 1016, also labeled as the a port on the server (see FIG. 10).

Together, these predicates indicate that (1) it is an error for server 1010 to be in serving mode if client 1028 is not blocked; (2) after server 1010 enters serving mode, a response message is sent or else an error occurs; and (3) server 1010 receiving a message means that server 1010 must enter serving mode. Relationships between control state and data paths must also be considered, such as:

(client.a ⇒client.blocked)

In other words, client 1028 must be in blocked mode whenever it sends an argument message.

The first predicate takes the same form as a constraint; however, since dedicated RPC coordinator 1000 only imports the client:blocked and server:serving modes (i.e., through RPC client imported state port 1022 and RPC server imported state port 1004 respectively), dedicated RPC coordinator 1000 is not allowed to alter these values to comply. In fact, none of these predicates is explicitly enforced by a runtime system. However, the last two can be used as requirements and guarantees for interface type-checking.

7. System-Level Execution

Coordination-centric design methodology lets system specifications be executed directly, according to the semantics described above. When components and coordinators are composed into higher-order structures, however, it becomes essential to consider hazards that can affect system behavior. Examples include conflicting constraints, in which local resolution semantics may either leave the system in an inconsistent state or make it cycle forever, and conflicting actions that undo one another's behavior. In the remainder of this section, the effect of composition issues on system-level executions is explained.

A. System Control Configurations

A configuration is the combined control state of a system—basically, the set of active modes at a point in time. In other words, a configuration in coordination-centric design is a bit vector containing one bit for each mode in the system. The bit representing a control state is true when the control state is active and false when the control state is inactive. Configurations representing the complete system control state facilitate reasoning on system properties and enable several forms of static analysis of system behavior.

B. Action-Trigger Propagation

Triggers are formal parameters for events. As mentioned earlier, there are two types of triggers: (1) control triggers, invoked by control events such as mode change requests, and (2) data flow triggers, invoked by data events such as message arrivals or departures. Components and coordinators can both request mode changes (on the modes visible to them) and generate new messages (on the message ports visible to them). Using actions, these events can be propagated through the components and coordinators in the system, causing a cascade of data transmissions and mode change requests, some of which can cancel other requests. When the requests, and secondary requests implied by them, are all propagated through the system, any requests that have not been canceled are confirmed and made part of the system's new configuration.

Triggers can be immediately propagated through their respective actions or delayed by a scheduling step. Recall that component actions can be either transparent or opaque. Transparent actions typically propagate their triggers immediately, although it is not absolutely necessary that they do so. Opaque actions typically must always delay propagation.

1. Immediate Propagation

Some triggers must be immediately propagated through actions, but only on certain types of transparent actions. Immediate propagation can often involve static precomputation of the effect of changes, which means that certain actions may never actually be performed. For example, consider a system with a coordinator that has an action that activates mode A and a coordinator with an action that deactivates mode B whenever A is activated. Static analysis can be used to determine in advance that any event that activates A will also deactivate B; therefore, this effect can be executed immediately without actually propagating it through A.

2. Delayed Propagation

Trigger propagation through opaque actions must typically be delayed, since the system cannot look into opaque actions to precompute their results. Propagation may be delayed for other reasons, such as system efficiency. For example, immediate propagation requires tight synchronization among software components. If functionality is spread among a number of architectural components, immediate propagation is impractical.

C. A Protocol Implemented with a Compound Coordinator

Multiple coordinators are typically needed in the design of a system. The multiple coordinators can be used together for a single, unified behavior. Unfortunately, one coordinator may interfere with another's behavior.

Figure 11:
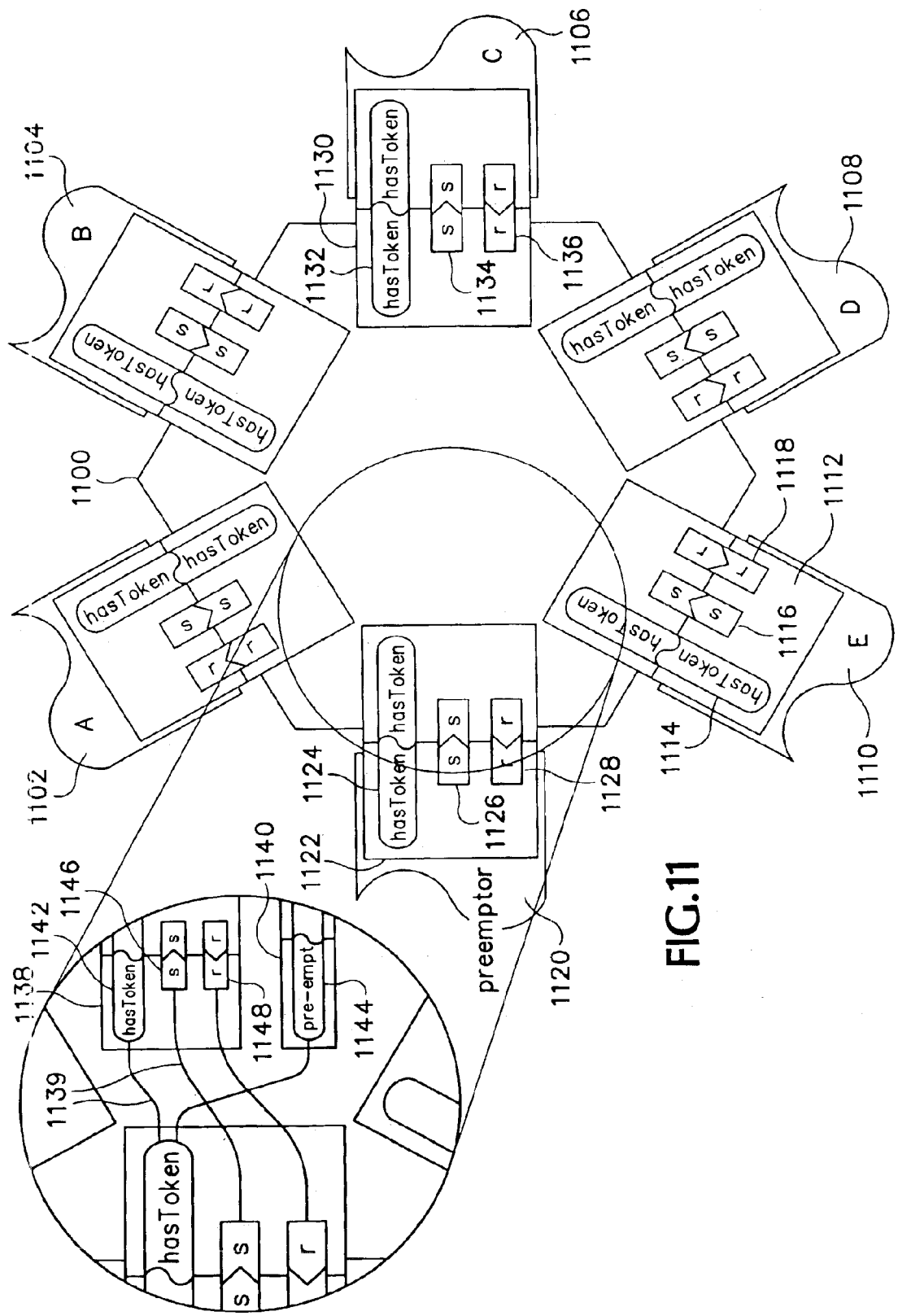
FIG. 11 is a compound coordinator with both preemption and round-robin coordination for controlling the access of a set of components to a shared resource.

FIG. 11 shows a combined coordinator 1100 with both preemption and round-robin coordination for controlling access to a resource, as discussed above. With reference to FIG. 11, components 1102, 1104, 1106, 1108, and 1110 primarily use round-robin coordination, and each includes a component coordination interface 1112, which has a component arbitrated control port 1114 and a component output message port 1116. However, when a preemptor component 1120 needs the resource, preemptor component 1120 is allowed to grab the resource immediately. Preemptor component 1120 has a preemptor component coordination interface 1122. Preemptor component coordination interface 1122 has a preemptor arbitrated state port 1124, a preemptor output message port 1126, and a preemptor input message port 1128.

All component coordination interfaces 1112 and preemptor component coordination interface 1122 are connected to a complementary combined coordinator coordination interface 1130, which has a coordinator arbitrated state port 1132, a coordinator input message port 1134, and a coordinator output message port 1136. Combined coordinator 1100 is a hierarchical coordinator and internally has a round-robin coordinator (not shown) and a preemption coordinator (not shown). Combined coordinator coordination interface 1130 is connected to a coordination interface to round-robin 1138 and a coordination interface to preempt 1140. Coordinator arbitrated state port 1132 is bound to both a token arbitrated control port 1142, which is part of coordination interface to round-robin 1138, and to a preempt arbitrated control port 1144, which is part of coordination interface to preempt 1140. Coordinator input message port 1134 is bound to an interface to a round-robin output message port 1146, and coordinator output message port 1136 is bound to an interface to round-robin input message port 1148.

Thus preemption interferes with the normal round-robin ordering of access to the resource. After a preemption-based access, the resource moves to the component that in round-robin-ordered access would be the successor to preemptor component 1120. If the resource is preempted too frequently, some components may starve.

D. Mixing Control and Data in Coordinators

Since triggers can be control-based, data-based, or both, and actions can produce both control and data events, control and dataflow aspects of a system are coupled through actions. Through combinations of actions, designers can effectively employ modal data flow, in which relative schedules are switched on and off based on the system configuration.

Relative scheduling is a form of coordination. Recognizing this and understanding how it affects a design can allow a powerful class of optimizations. Many data-centric systems (or subsystems) use conjunctive firing, which means that a component buffers messages until a firing rule is matched. When matching occurs, the component fires, consuming the messages in its buffer that caused it to fire and generating a message or messages of its own. Synchronous data flow systems are those in which all components have only firing rules with constant message consumption and generation.

Figure 12A:
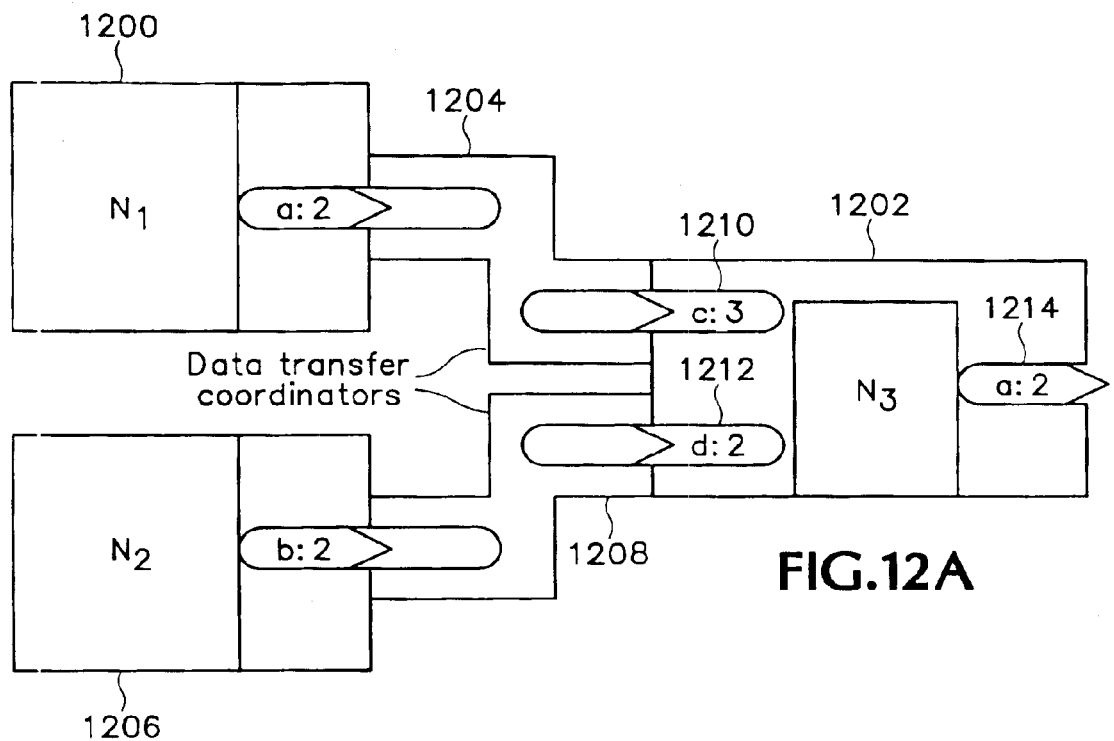
FIG. 12A is software system with two data transfer coordinators, each having constant message consumption and generation rules and each connected to a separate data-generating component and connected to the same data-receiving component.

FIG. 12A shows a system in which a component N1 1200 is connected to a component N3 1202 by a data transfer coordinator 1204 and a component N2 1206 is connected to component N3 1202 by a second data transfer coordinator 1208. Component N3 1202 fires when it accumulates three messages on a port c 1210 and two messages on a port d 1212. On firing, component N3 1202 produces two messages on a port o 1214. Coordination control state tracks the logical buffer depth for these components. This is shown with numbers representing the logical queue depth of each port in FIG. 12.

Figure 12B:
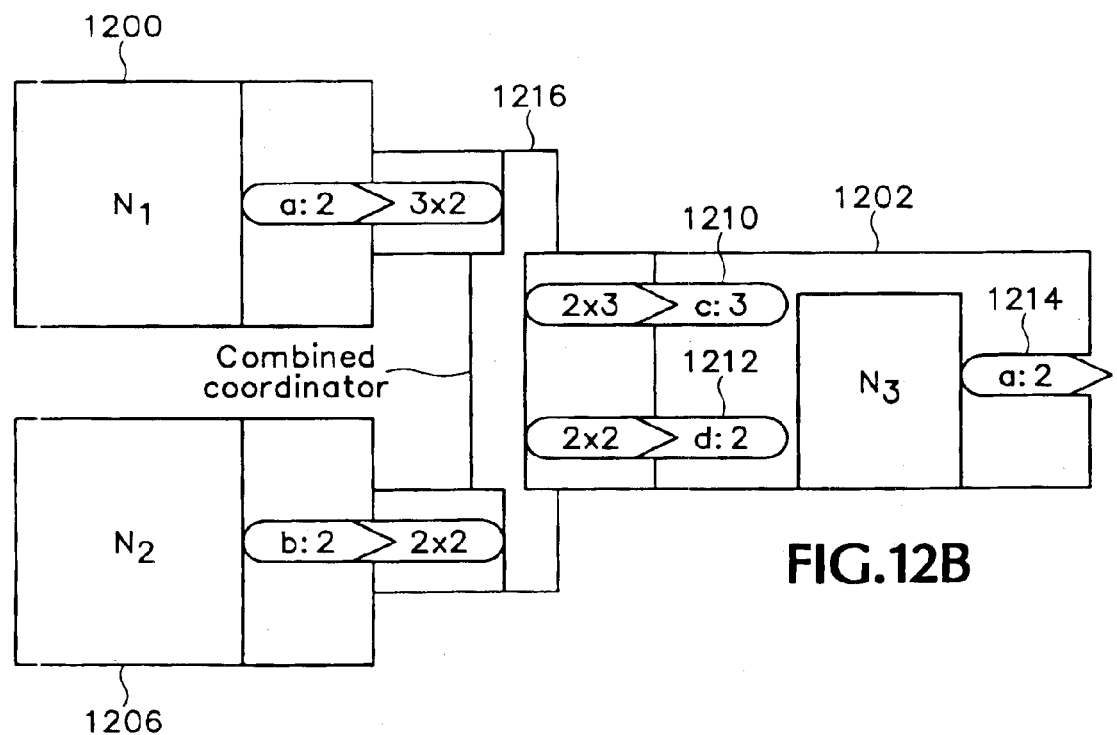
FIG. 12B is the software system of FIG. 12A in which the two data transfer coordinators have been replaced with a merged data transfer coordinator.

FIG. 12B shows the system of FIG. 12A in which data transfer coordinator 1204 and second data transfer coordinator 1208 have been merged to form a merged data transfer coordinator 1216. Merging the coordinators in this example provides an efficient static schedule for component firing. Merged data transfer coordinator 1216 fires component N1 1200 three times and component N2 1206 twice. Merged data transfer coordinator 1216 then fires component N3 1202 twice (to consume all messages produced by component N1 1200 and component N2 1206).

Message rates can vary based on mode. For example, a component may consume two messages each time it fires in one mode and four each time it fires in a second mode. For a component like this, it is often possible to merge schedules on a configuration basis, in which each configuration has static consumption and production rates for all affected components.

E. Coordination Transformations

In specifying complete systems, designers must often specify not only the coordination between two objects, but also the intermediate mechanism they must use to implement this coordination. While this intermediate mechanism can be as simple as shared memory, it can also be another coordinator; hence coordination may be, and often is, layered. For example, RPC coordination often sits on top of a TCP/IP stack or on an IrDA stack, in which each layer coordinates with peer layers on other processing elements using unique coordination protocols. Here, each layer provides certain capabilities to the layer directly above it, and the upper layer must be implemented in terms of them.

In many cases, control and communication synthesis can be employed to automatically transform user-specified coordination to a selected set of standard protocols. Designers may have to manually produce transformations for non-standard protocols.

F. Dynamic Behavior with Compound Coordinators

Even in statically bound systems, components may need to interact in a fashion that appears dynamic. For example, RPC-style coordination often has multiple clients for individual servers. Here, there is no apparent connection between client and server until one is forged for a transaction. After the connection is forged, however, the coordination proceeds in the same fashion as dedicated RPC.

Our approach to this is to treat the RPC server as a shared resource, requiring resource allocation protocols to control access. However, none of the resource allocation protocols described thus far would work efficiently under these circumstances. In the following subsections, an appropriate protocol for treating the RPC as a shared resource will be described and how that protocol should be used as part of a complete multiclient RPC coordination class—one that uses the same RPC coordination interfaces described earlier—will be discussed.

1. First Come/First Serve Protocol (FCFS)

Figure 13:
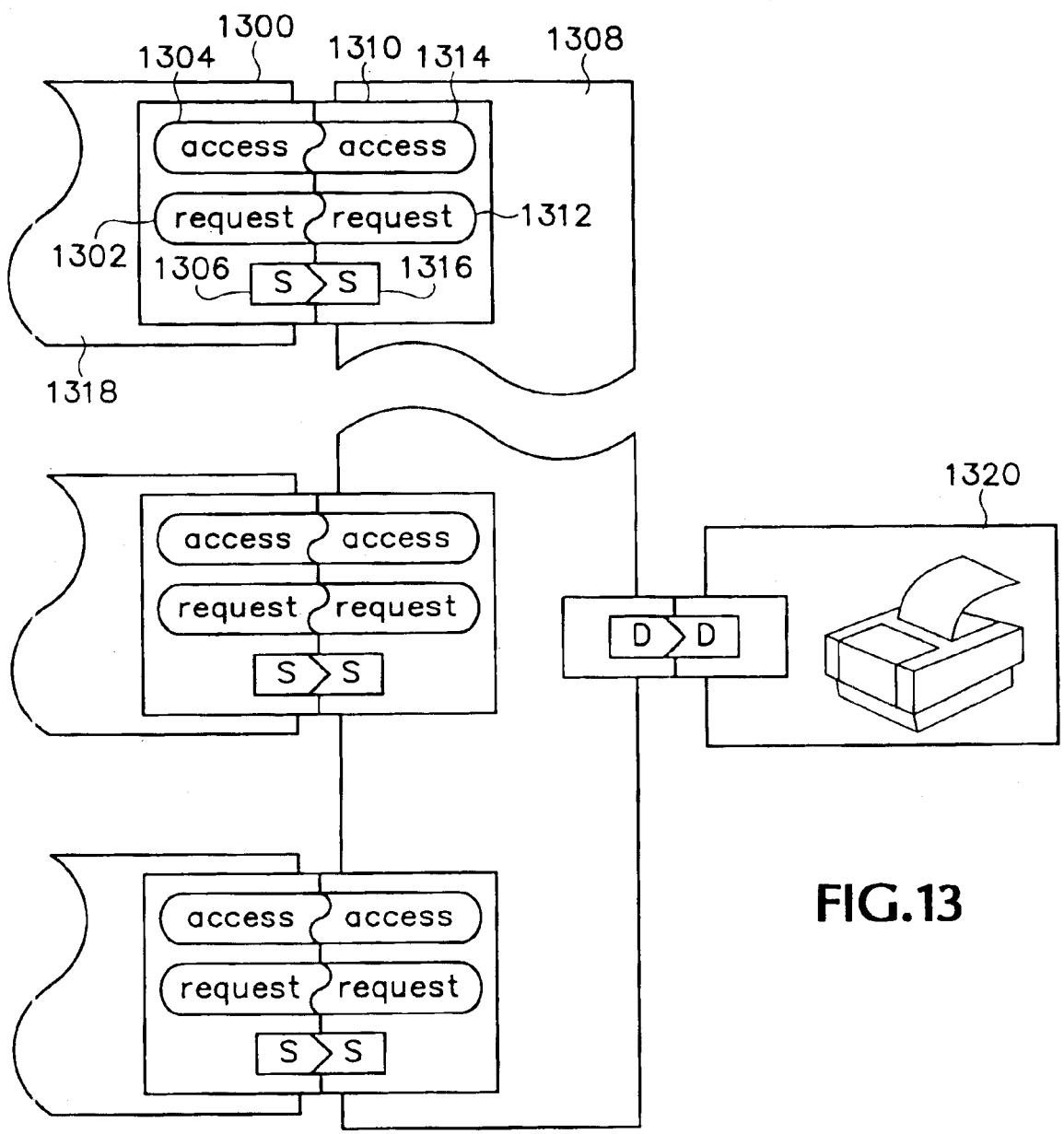
FIG. 13 is a system implementing a first come, first served resource allocation protocol in accordance with the present invention.

FIG. 13 illustrates a first come/first serve (FCFS) resource allocation protocol, which is a protocol that allocates a shared resource to the requester that has waited longest. With reference to FIG. 13, a FCFS component interface 1300 for this protocol has a request control port 1302, an access control port 1304 and a component outgoing message port 1306. A FCFS coordinator 1308 for this protocol has a set of FCFS interfaces 1310 that are complementary to FCFS component interfaces 1300, having a FCFS coordinator request control port 1312, a FCFS coordinator access port 1314, and a FCFS coordinator input message port 1316. When a component 1318 needs to access a resource 1320, it asserts request control port 1302. When granted access, FCFS coordinator 1308 asserts the appropriate FCFS coordinator access port 1314, releasing FCFS coordinator request control port 1312.

To do this, FCFS coordinator 1308 uses a rendezvous coordinator and two round-robin coordinators. One round-robin coordinator maintains a list of empty slots in which a component may be enqueued, and the other round-robin coordinator maintains a list showing the next component to be granted access. When an FCFS coordinator request control port 1312 becomes active, FCFS coordinator 1308 begins a rendezvous access to a binder action. When activated, this action maps the appropriate component 1318 to a position in the round-robin queues. A separate action cycles through one of the queues and selects the next component to access the server. As much as possible, FCFS coordinator 1308 attempts to grant access to resource 1320 to the earliest component 1318 having requested resource 1320, with concurrent requests determined based on the order in the rendezvous coordinator of the respective components 1318.

2. Multiclient RPC

Figure 14:
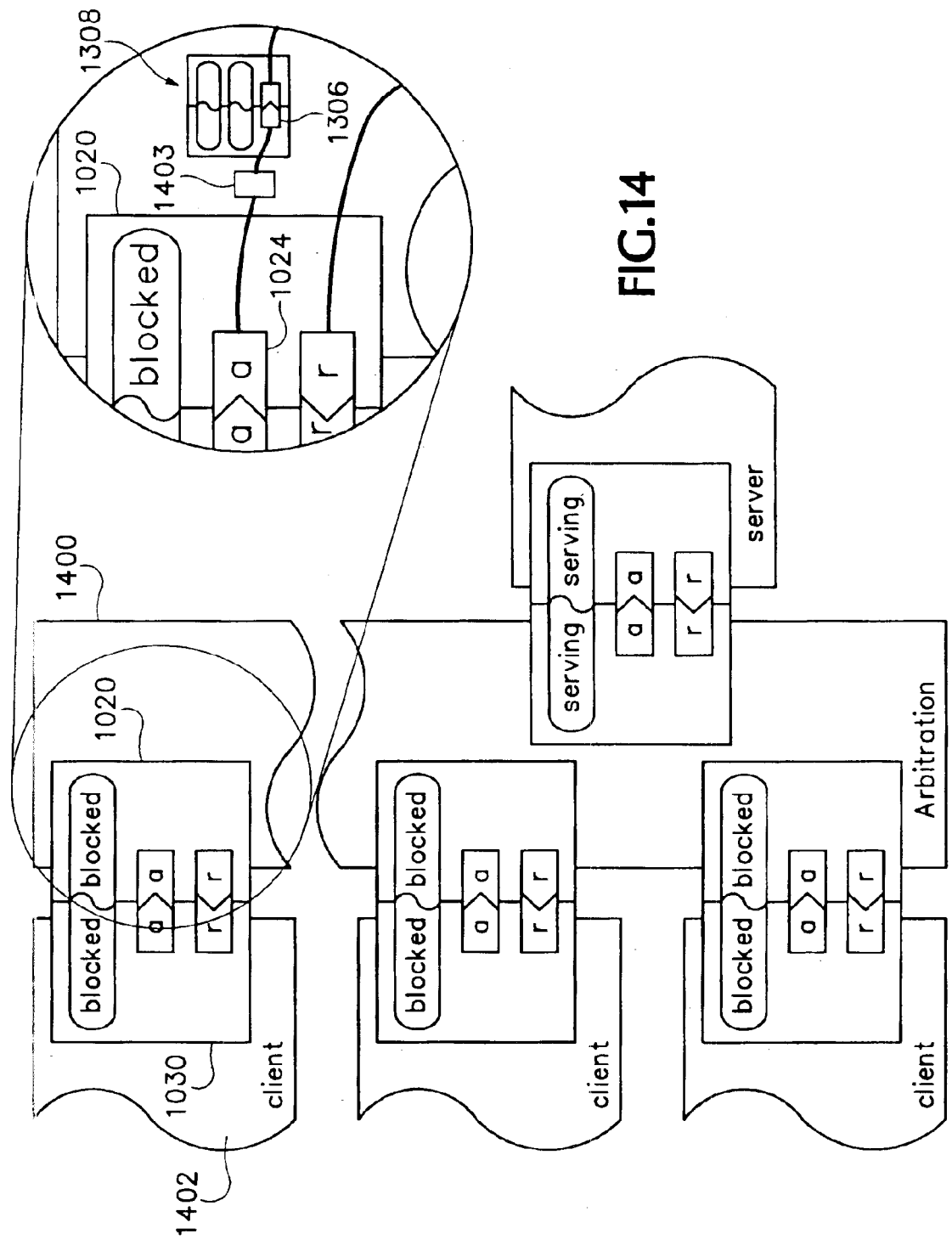
FIG. 14 is a system implementing a multiclient RPC coordination protocol formed by combining the first come, first served protocol of FIG. 13 with the dedicated RPC coordinator of FIG. 10.

FIG. 14 depicts a multiclient RPC coordinator 1400 formed by combining FCFS coordinator 1308 with dedicated RPC coordinator 1000. With reference to FIG. 14, a set of clients 1402 have a set of client coordination interfaces 1030, as shown in FIG. 10. In addition, multiclient RPC coordinator 1400 has a set of RPC client coordination interfaces 1020, as shown in FIG. 10. For each RPC client coordination interface 1020, RPC client input message port 1024, of RPC client coordination interface 1020, is bound to the component outgoing message port 1306 of FCFS coordinator 1308. Message transfer action 1403 serves to transfer messages between RPC client input message port 1024 and component outgoing message port 1306. For coordinating the actions of multiple clients 1402, multiclient RPC coordinator 1400 must negotiate accesses to a server 1404 and keep track of the values returned by server 1404.

F. Monitor Modes and Continuations

Features such as blocking behavior and exceptions can be implemented in the coordination-centric design methodology with the aid of monitor modes. Monitor modes are modes that exclude all but a selected set of actions called continuations, which are actions that continue a behavior started by another action.

1. Blocking Behavior

With blocking behavior, one action releases control while entering a monitor mode, and a continuation resumes execution after the anticipated response event. Monitor mode entry must be immediate (at least locally), so that no unexpected actions can execute before they are blocked by such a mode.

Each monitor mode has a list of actions that cannot be executed when it is entered. The allowed (unlisted) actions are either irrelevant or are continuations of the action that caused entry into this mode. There are other conditions, as well. This mode requires an exception action if forced to exit. However, this exception action is not executed if the monitor mode is turned off locally.

When components are distributed over a number of processing elements, it is not practical to assume complete synchronization of the control state. In fact, there are a number of synchronization options available as detailed in Chou, P "Control Composition and Synthesis of Distributed Real-Time Embedded Systems", Ph.D. dissertation, University of Washington, 1998.

2. Exception Handling

Exception actions are a type of continuation. When in a monitor mode, exception actions respond to unexpected events or events that signal error conditions. For example, multiclient RPC coordinator 1400 can bind ⇒client.blocked to a monitor mode and set an exception action on +server.serving. This will signal an error whenever the server begins to work when the client is not blocked for a response.

8. A Complete System Example

Figure 15:
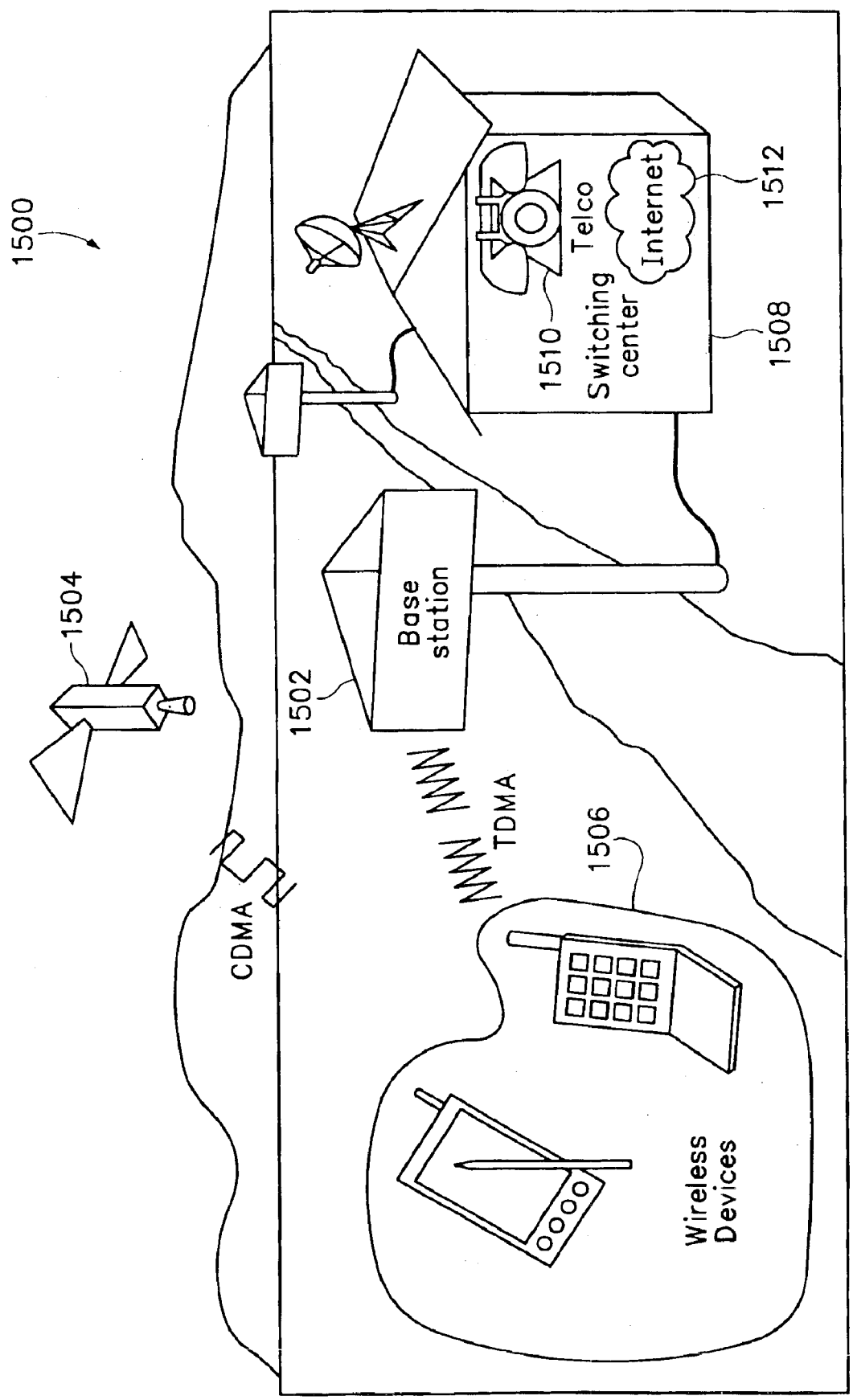
FIG. 15 depicts a large system in which the coordination-centric design methodology can be employed having a wireless device interacting with a cellular network.

FIG. 15 depicts a large-scale example system under the coordination-centric design methodology. With reference to FIG. 15, the large scale system is a bimodal digital cellular network 1500. Network 1500 is for the most part a simplified version of a GSM (global system for mobile communications) cellular network. This example shows in greater detail how the parts of coordination-centric design work together and demonstrates a practical application of the methodology. Network 1500 has two different types of cells, a surface cell 1502 (also referred to as a base station 1502) and a satellite cell 1504. These cells are not only differentiated by physical position, but by the technologies they use to share network 1500. Satellite cells 1504 use a code division multiple access (CDMA) technology, and surface cells 1502 use a time division multiple access (TDMA) technology. Typically, there are seven frequency bands reserved for TDMA and one band reserved for CDMA. The goal is for as much communication as possible to be conducted through the smaller TDMA cells, here surface cells 1502, because power requirements for a CDMA cells, here satellite cell 1504, increase with the number of users in the CDMA cell. Mobile units 1506, or wireless devices, can move between surface cells 1502, requiring horizontal handoffs between surface cells 1502. Several surface cells 1502 are typically connected to a switching center 1508. Switching center 1508 is typically connected to a telephone network or the Internet 1512. In addition to handoffs between surface cells 1502, the network must be able to hand off between switching centers 1508. When mobile units 1506 leave the TDMA region, they remain covered by satellite cells 1504 via vertical handoffs between cells. Since vertical handoffs require changing protocols as well as changing base stations and switching centers, they can be complicated in terms of control.

Numerous embedded systems comprise the overall system. For example, switching center 1508 and base stations, surface cells 1502, are required as part of the network infrastructure, but cellular phones, handheld Web browsers, and other mobile units 1506 may be supported for access through network 1500. This section concentrates on the software systems for two particular mobile units 1506: a simple digital cellular phone (shown in FIG. 16) and a handheld Web browser (shown in FIG. 24). These examples require a wide variety of coordinators and reusable components. Layered coordination is a feature in each system, because a function of many subsystems is to perform a layered protocol. Furthermore, this example displays how the hierarchically constructed components can be applied in a realistic system to help manage the complexity of the overall design.

To begin this discussion, we describe the cellular phone in detail, focusing on its functional components and the formalization of their interaction protocols. We then discuss the handheld Web browser in less detail but highlight the main ways in which its functionality and coordination differ from those of the cellular phone. In describing the cellular phone, we use a top-down approach to show how a coherent system organization is preserved, even at a high level. In describing the handheld Web browser, we use a bottom-up approach to illustrate component reuse and bottom-up design.

A. Cellular Phone

FIG. 16 shows a top-level coordination diagram of the behavior of a cell phone 1600. Rather than using a single coordinator that integrates the components under a single protocol, we use several coordinators in concert. Interactions between coordinators occur mainly within the components to which they connect.

With reference to FIG. 16, cell phone 1600 supports digital encoding of voice streams. Before it can be used, it must be authenticated with a home master switching center (not shown). This authentication occurs through a registered master switch for each phone and an authentication number from the phone itself. There are various authentication statuses, such as full access, grey-listed, or blacklisted. For cell phone 1600, real-time performance is more important than reliability. A dropped packet is not retransmitted, and a late packet is dropped since its omission degrades the signal less than its late incorporation.

Each component of cell phone 1600 is hierarchical. A GUI 1602 lets users enter phone numbers while displaying them and query an address book 1604 and a logs component 1606. Address book 1604 is a database that can map names to phone numbers and vice versa. GUI 1602 uses address book 1604 to help identify callers and to look up phone numbers to be dialed. Logs 1606 track both incoming and outgoing calls as they are dialed. A voice component 1608 digitally encodes and decodes, and compresses and decompresses, an audio signal. A connection component 1610 multiplexes, transmits, receives, and demultiplexes the radio signal and separates out the voice stream and caller identification information.

Coordination among the above components makes use of several of the coordinators discussed above. Between connection component 1610 and a clock 1612, and between logs 1606 and connection component 1610, are unidirectional data transfer coordinators 600 as described with reference to FIG. 6A. Between voice component 1608 and connection component 1610, and between GUI 1602 and connection component 1610, are bidirectional data transfer coordinators 604, as described with reference to FIG. 6B. Between clock 1612 and GUI 1602 is a state unification coordinator 606, as described with reference to FIG. 6C. Between GUI 1602 and address book 1604 is a dedicated RPC coordinator 1000 as described with reference to FIG. 10, in which address book 1604 has client 1028 and GUI 1602 has server 1010.

There is also a custom GUI/log coordinator 1614 between logs 1606 and GUI 1602. GUI/log coordinator 1614 lets GUI 1602 transfer new logged information through an r output message port 1616 on a GUI coordination interface 1618 to an r input message port 1620 on a log coordination interface 1622. GUI/log coordinator 1614 also lets GUI 1602 choose current log entries through a pair of c output message ports 1624 on GUI coordination interface 1618 and a pair of c input message ports 1626 on log coordination interface 1622. Logs 1606 continuously display one entry each for incoming and outgoing calls.

1. GUI Component

Figure 17A:
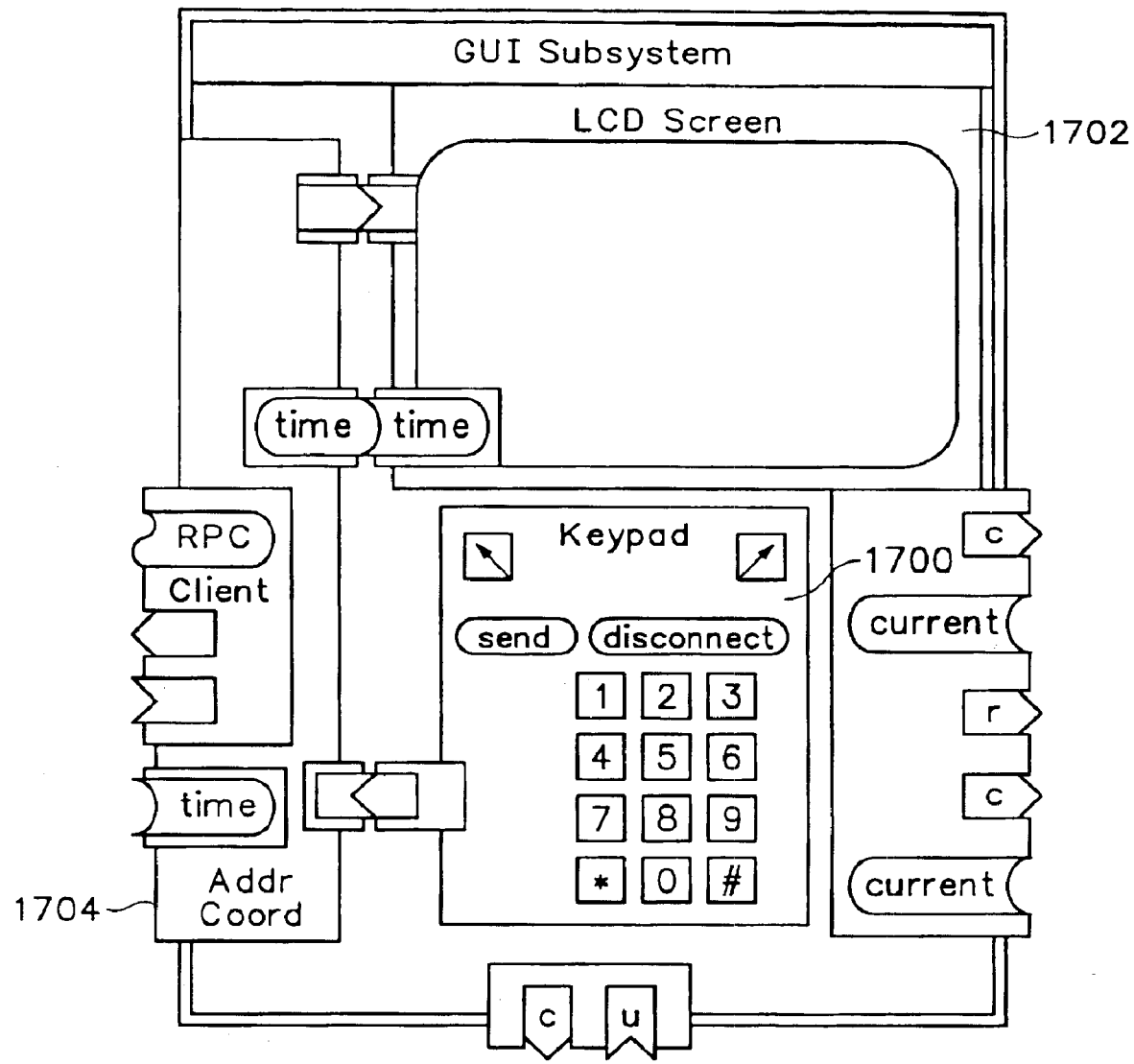
FIG. 17A is a detailed view of a GUI component of the cell phone of FIG. 16.

FIG. 17A is a detailed view of GUI component 1602, of FIG. 16. With reference to FIG. 17A, GUI component 1602 has two inner components, a keypad 1700 and a text-based liquid crystal display 1702, as well as several functions of its own (not shown). Each time a key press occurs, it triggers an action that interprets the press, depending on the mode of the system. Numeric presses enter values into a shared dialing buffer. When a complete number is entered, the contents of this buffer are used to establish a new connection through connection component 1610. Table 5 shows the action triples for GUI 1602.

| Mode | Trigger | Action |
|---|---|---|
| Idle | 1 — # | numBuffer.append(keypress.val) |
|  | Send | radio.send(numBuffer.val) + outgoingCall |
|  | Disconnect | Nil |
|  | Leftarrow | AddressBook.forward() + lookupMode |
|  | Rightarrow | log.lastcall() + outlog |
| LookupMode | Leftarrow | AddressBook.forward() |
|  | Rightarrow | AddressBook.backward() |

An "Addr Coord" coordinator 1704 includes an address book mode (not shown) in which arrow key presses are transformed into RPC calls.

2. Logs Component

Figure 17B:
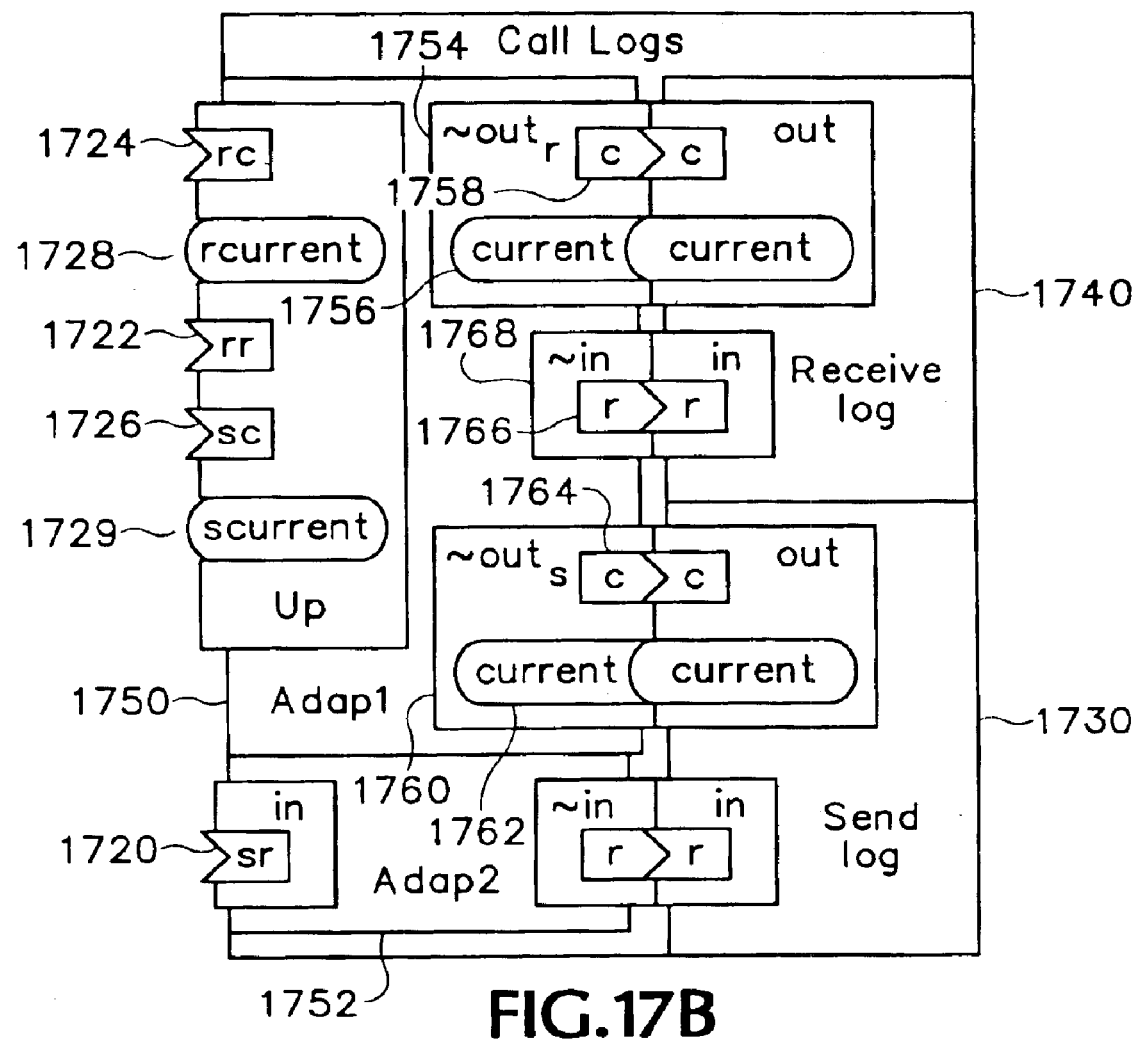
FIG. 17B is a detailed view of a call log component of the cell phone of FIG. 16.

FIG. 17B is a detailed view of logs component 1606, which tracks all incoming and outgoing calls. With reference to FIG. 17B, both GUI component 1602 and connection component 1610 must communicate with logs component 1606 through specific message ports. Those specific message ports include a transmitted number message port 1720, a received number message port 1722, a change current received message port 1724, a change current transmitted message port 1726, and two state ports 1728 and 1729 for presenting the current received and current transmitted values, respectively.

Logs component 1606 contains two identical single-log components: a send log 1730 for outgoing calls and a receive log 1740 for incoming calls. The interface of logs component 1606 is connected to the individual log components by a pair of adapter coordinators, Adap1 1750 and Adap2 1752. Adap1 1750 has an adapter receive interface 1754, which has a receive imported state port 1756 and a receive output message port 1758. Adap1 1750 further has an adapter send interface 1760, which has a send imported state port 1762 and a send output message port 1764. Within Adap1, state port 1728 is bound to receive imported state port 1756, change current received message port 1724 is bound to receive output message port 1758, received number message port 1722 is bound to a received interface output message port 1766 on a received number coordination interface 1768, change current transmitted message port 1726 is bound to send output message port 1764, and state port 1729 is bound to Up.rc is bound to send imported state port 1762.

3. Voice Component

Figure 18A:
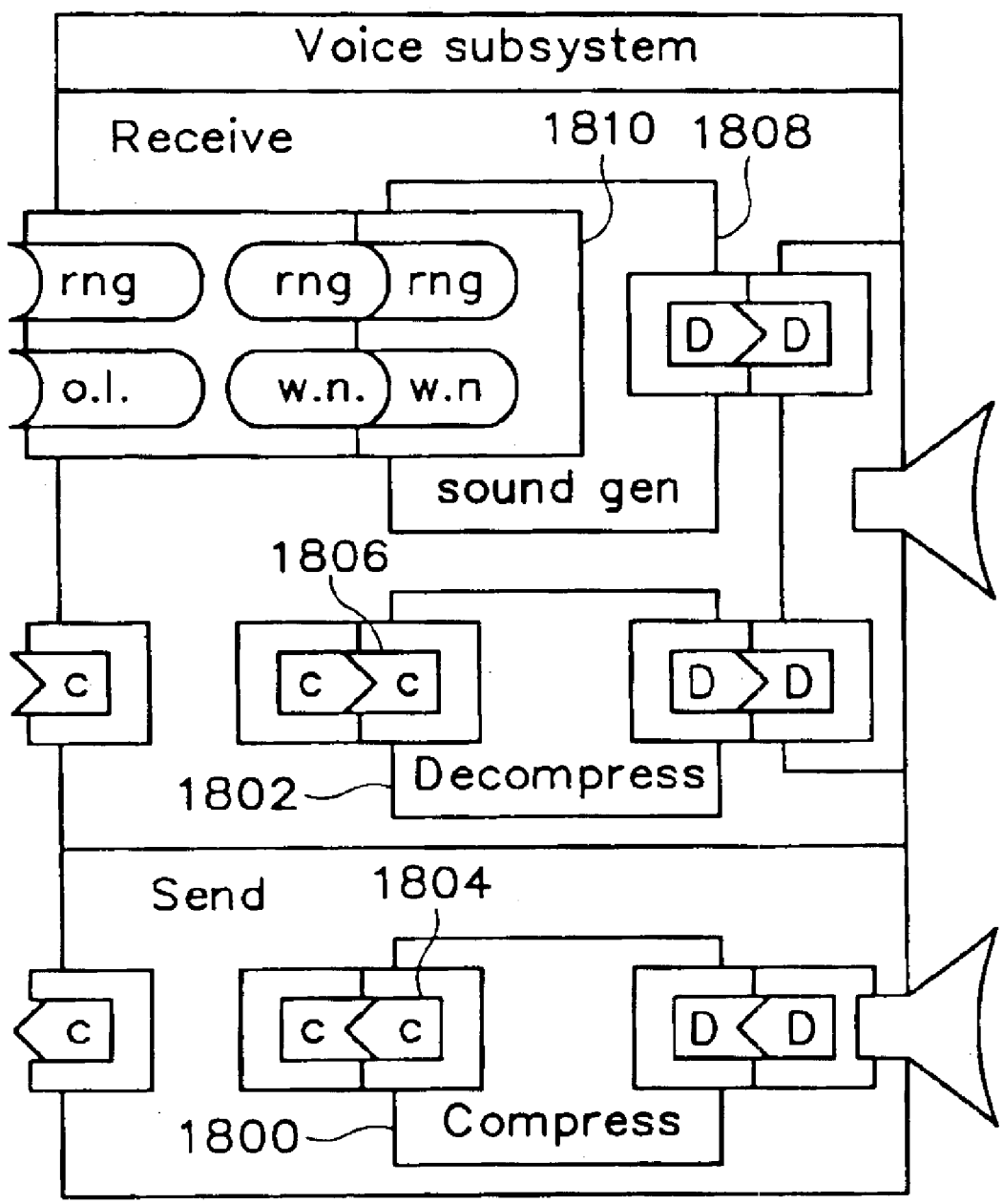
FIG. 18A is a detailed view of a voice subsystem component of the cell phone of FIG. 16.

FIG. 18A is a detailed view of voice component 1608 of FIG. 16. Voice component 1608 has a compression component 1800 for compressing digitized voice signals before transmission, a decompression component 1802 for decompressing received digitized voice signals, and interfaces 1804 and 1806 to analog transducers (not shown) for digitizing sound to be transmitted and for converting received transmissions into sound. Voice component 1608 is a pure data flow component containing sound generator 1808 which functions as a white-noise generator, a ring tone generator, and which has a separate port for each on sound generator interface 1810, and voice compression functionality in the form of compression component 1800 and decompression component 1802.

4. Connection Component

Figure 18B:
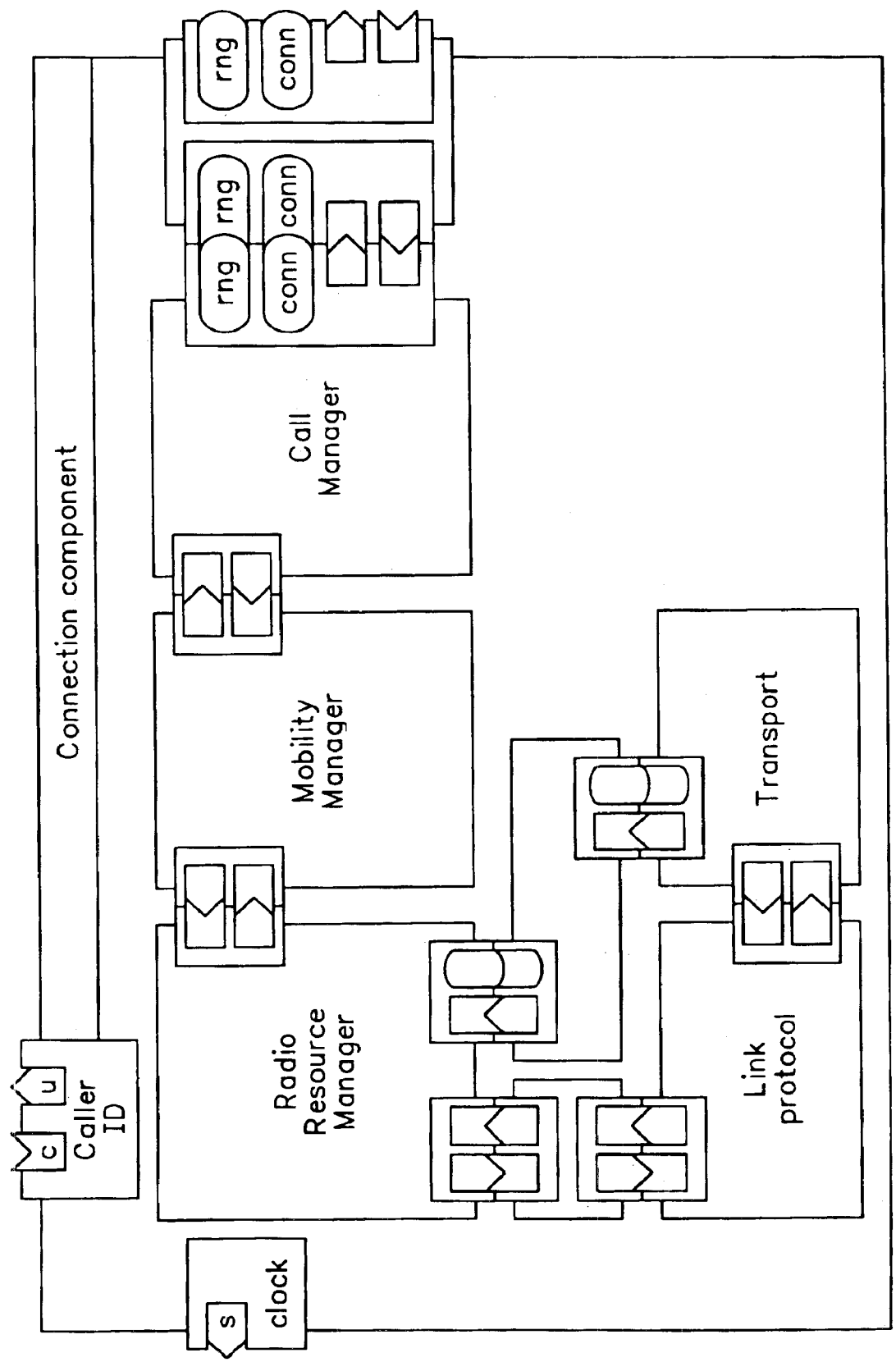
FIG. 18B is a detailed view of a connection component of the cell phone of FIG. 16.

FIG. 18B is a detailed view of connection component 1610 of FIG. 16. With reference to FIG. 18B, connection component 1610 coordinates with voice component 1608, logs component 1606, clock 1612, and GUI 1602. In addition, connection component 1610 is responsible for coordinating the behavior of cell phone 1600 with a base station that owns the surface cell 1502 (shown in FIG. 15), a switching center 1508 (shown in FIG. 15), and all other phones (not shown) within surface cell 1502. Connection component 1610 must authenticate users, establish connections, and perform handoffs as needed—including appropriate changes in any low-level protocols (such as a switch from TDMA to CDMA).

Figure 19:
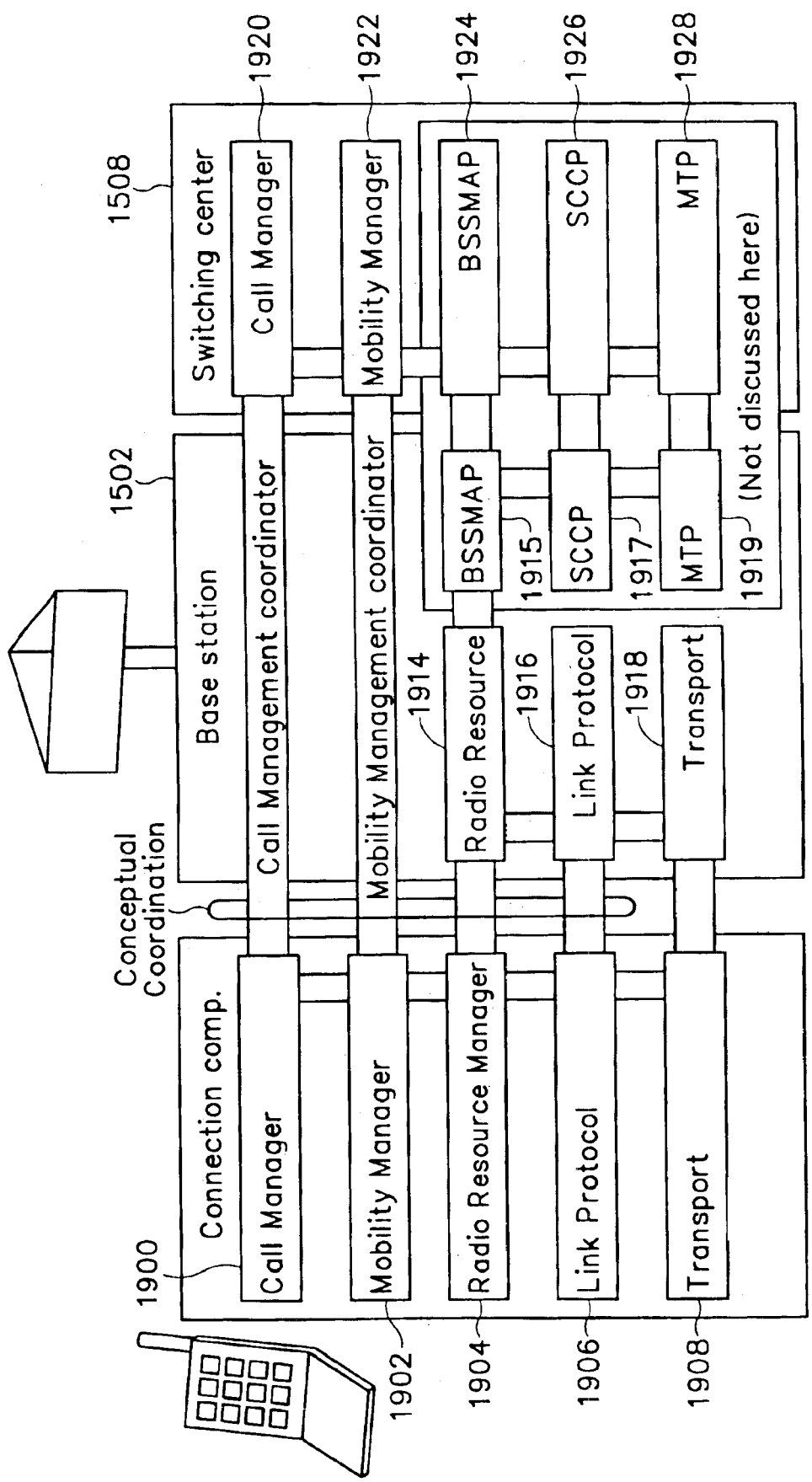
FIG. 19 depicts the coordination layers between a wireless device and a base station, and between the base station and a switching center, of FIG. 15.

FIG. 19 depicts a set of communication layers between connection component 1610 of cell phone 1600 and base station 1502 or switching center 1508. With reference to FIG. 19, has several subcomponents, or lower-level components, each of which coordinates with an equivalent, or peer, layer on either base station 1502 or switching center 1508. The subcomponents of connection component 1610 include a cell phone call manager 1900, a cell phone mobility manager 1902, a cell phone radio resource manager 1904, a cell phone link protocol manager 1906, and a cell phone transport manager 1908 which is responsible for coordinating access to and transferring data through the shared airwaves TDMA and CDMA coordination. Each subcomponent will be described in detail including how each fits into the complete system.

Base station 1502 has a call management coordinator 1910, a mobility management coordinator 1912, a radio resource coordinator 1914 (BSSMAP 1915), a link protocol coordinator 1916 (SCCO 1917), and a transport coordinator 1918 (MTP 1919). Switching center 1508 has a switching center call manager 1920, a switching center mobility manager 1922, (a BSSMAP 1924, a SCCP 1926, and an MTP 1928).

a. Call Management

Figure 20:
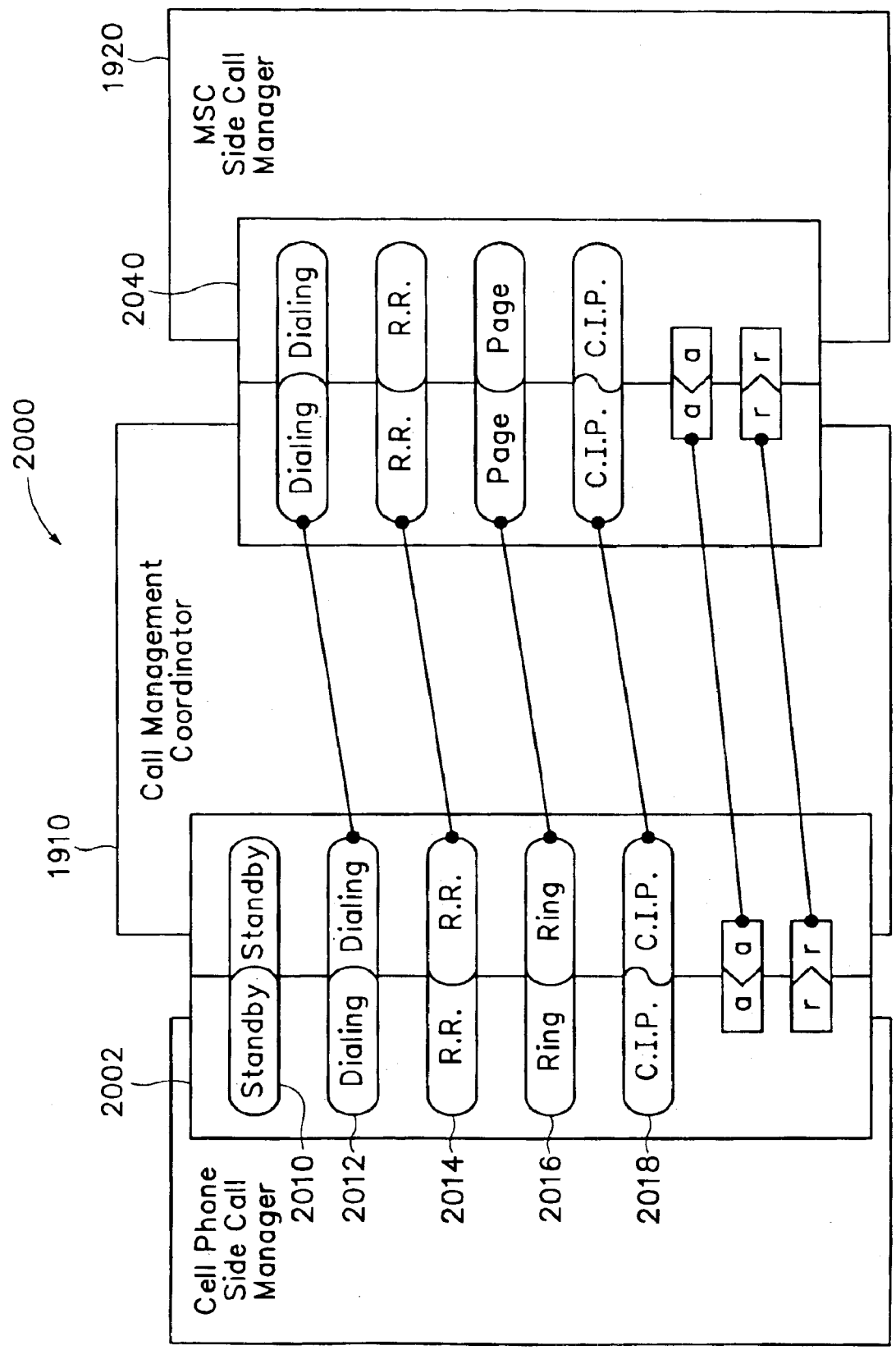
FIG. 20 depicts a cell phone call management component, a master switching center call management component, and a call management coordinator connecting the respective call management components.

FIG. 20 is a detailed view of a call management layer 2000 consisting of cell phone call manager 1900, which is connected to switching center call manager 1920 by call management coordinator 1910. With reference to FIG. 20, call management layer 2000 coordinates the connection between cell phone 1600 and switching center 1508. Call management layer 2000 is responsible for dialing, paging, and talking. Call management layer 2000 is always present in cell phone 1600, though not necessarily in Internet appliances (discussed later). Cell phone call manager 1900 includes a set of modes (not shown) for call management coordination that consists of the following modes:

Standby
Dialing
RingingRemote
Ringing
CallInProgress

Cell phone call manager 1900 has a cell phone call manager interface 2002. Cell phone call manager interface 2002 has a port corresponding to each of the above modes. The standby mode is bound to a standby exported state port 2010. The dialing mode is bound to a dialing exported state port 2012. The RingingRemote mode is bound to a RingingRemote imported state port 2014. The Ringing mode is bound to a ringing imported state port 2016. The CallInProgress mode is bound to a CallInProgress arbitrated state port 2018.

Switching center call manager 1920 includes the following modes (not shown) for call management coordination at the switching center:

Dialing

RingingRemote

Paging

CallInProgress

Switching center call manager 1920 has a switching center call manager coordination interface 2040, which includes a port for each of the above modes within switching center call manager 1920.

When cell phone 1600 requests a connection, switching center 1508 creates a new switching center call manager and establishes a call management coordinator 1910 between cell phone 1600 and switching center call manager 1920.

b. Mobility Management

A mobility management layer authenticates mobile unit 1506 or cell phone 1600. When there is a surface cell 1502 available, mobility manager 1902 contacts the switching center 1508 for surface cell 1502 and transfers a mobile unit identifier (not shown) for mobile unit 1506 to switching center 1508. Switching center 1508 then looks up a home motor switching center for mobile unit 1506 and establishes a set of permissions assigned to mobile unit 1506. This layer also acts as a conduit for the call management layer. In addition, the mobility management layer performs handoffs between base stations 1502 and switching centers 1508 based on information received from the radio resource layer.

c. Radio Resource

In the radio resource layer, radio resource manager 1904, chooses the target base station 1502 and tracks changes in frequencies, time slices, and CDMA codes. Cell phones may negotiate with up to 16 base stations simultaneously. This layer also identifies when handoffs are necessary.

d. Link Protocol

The link layer manages a connection between cell phone 1600 and base station 1502. In this layer, link protocol manager 1906 packages data for transfer to base station 1502 from cell phone 1600.

e. Transport

Figure 21A:
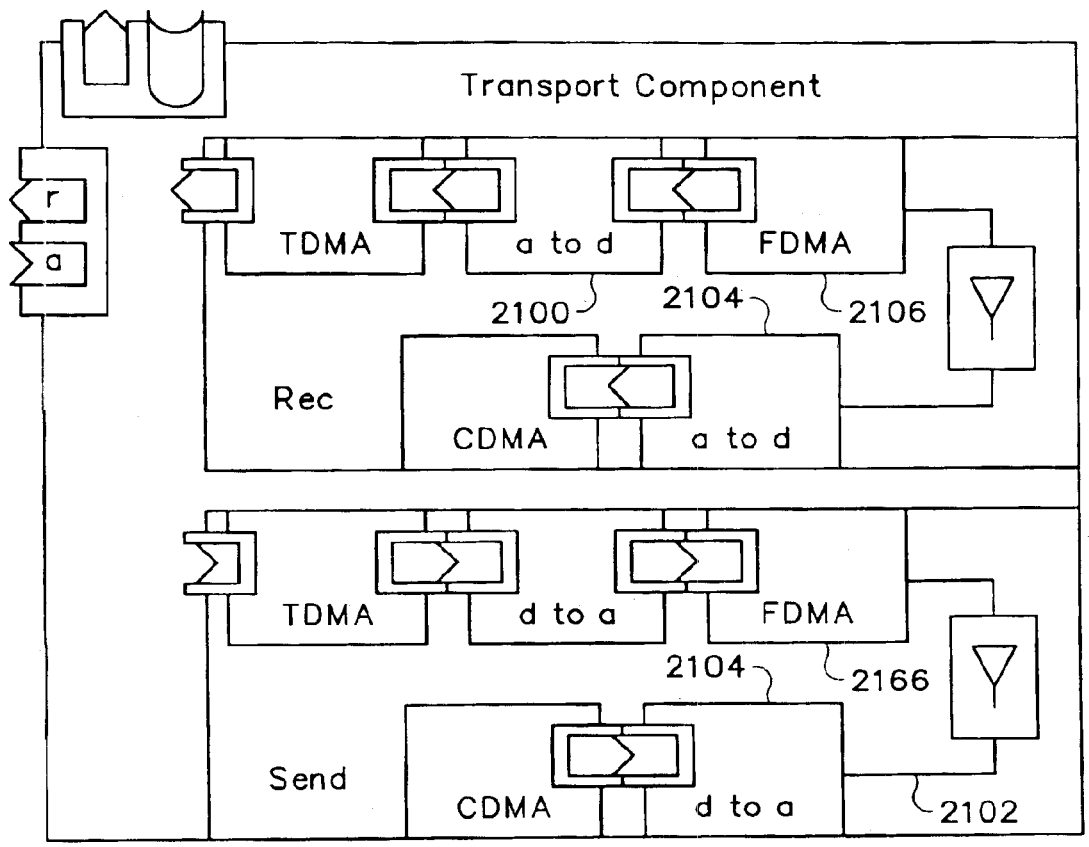
FIG. 21A is a detailed view of a transport component of the connection component of FIG. 18B.

FIG. 21A is a detailed view of transport component 1908 of connection component 1610. Transport component 1908 has two subcomponents, a receive component 2100 for receiving data and a transmit component 2102 for transmitting data. Each of these subcomponents has two parallel data paths a CDMA path 2104 and a TDMA/FDMA path 2106 for communicating in the respective network protocols.

Figure 21B:
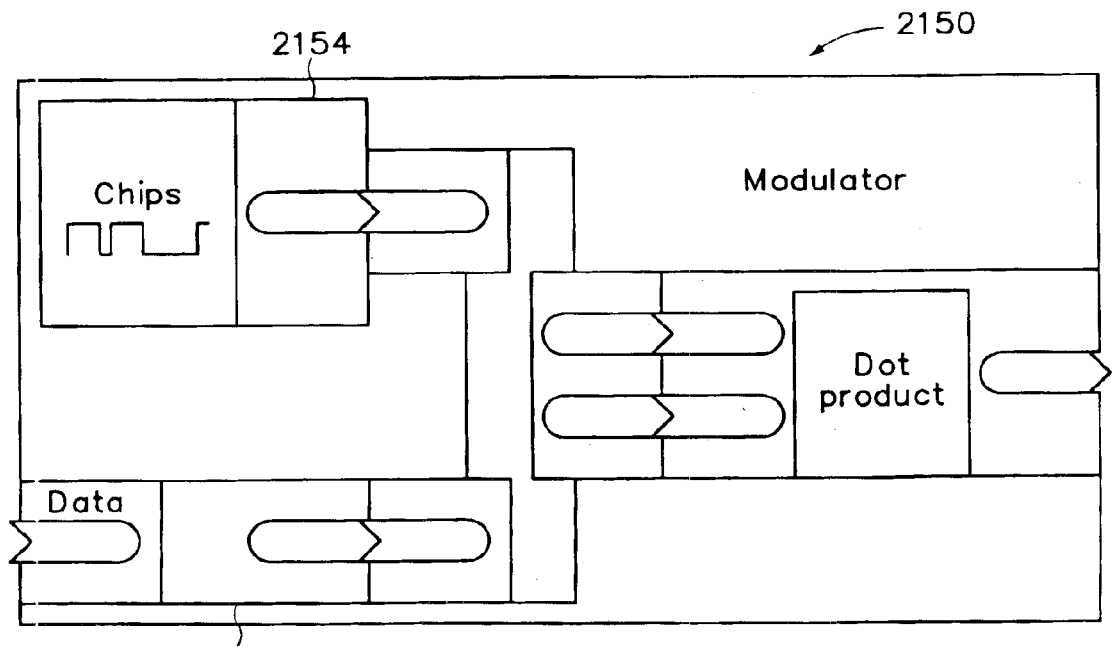
FIG. 21B is a CDMA data modulator of the transport component of FIG. 18B.

FIG. 21B is a detailed view of a CDMA modulator 2150, which implements a synchronous data flow data path. CDMA modulator 2150 takes the dot-product of an incoming data signal along path 2152 and a stored modulation code for cell phone 1600 along path 2154, which is a sequence of chips, which are measured time signals having a value of −1 or +1.

Transport component 1908 uses CDMA and TDMA technologies to coordinate access to a resource shared among several cell phones 1600, i.e., the airwaves. Transport components 1908 supersede the FDMA technologies (e.g., AM and FM) used for analog cellular phones and for radio and television broadcasts. In FDMA, a signal is encoded for transmission by modulating it with a carrier frequency. A signal is decoded by demodulation after being passed through a band pass filter to remove other carrier frequencies. Each base station 1502 has a set of frequencies—chosen to minimize interference between adjacent cells. (The area covered by a cell may be much smaller than the net range of the transmitters within it.)

TDMA, on the other hand, coordinates access to the airwaves through time slicing. Cell phone 1600 on the network is assigned a small time slice, during which it has exclusive access to the media. Outside of the small time slice, cell phone 1600 must remain silent. Decoding is performed by filtering out all signals outside of the small time slice. The control for this access must be distributed. As such, each component involved must be synchronized to observe the start and end of the small time slice at the same instant.

Most TDMA systems also employ FDMA, so that instead of sharing a single frequency channel, cell phones 1600 share several channels. The band allocated to TDMA is broken into frequency channels, each with a carrier frequency and a reasonable separation between channels. Thus user channels for the most common implementations of TDMA can be represented as a two-dimensional array, in which the rows represent frequency channels and the columns represent time slices.

CDMA is based on vector arithmetic. In a sense, CDMA performs inter-cell-phone phone coordination using data flow. Instead of breaking up the band into frequency channels and time slicing these, CDMA regards the entire band as an n-dimensional vector space. Each channel is a code that represents a basis vector in this space. Bits in the signal are represented as either 1 or −1, and the modulation is the inner product of this signal and a basis vector of mobile unit 1506 or cell phone 1600. This process is called spreading, since it effectively takes a narrowband signal and converts it into a broadband signal.

Demultiplexing is simply a matter of taking the dot-product of the received signal with the appropriate basis vector, obtaining the original 1 or −1. With fast computation and the appropriate codes or basis vectors, the signal can be modulated without a carrier frequency. If this is not the case, a carrier and analog techniques can be used to fill in where computation fails. If a carrier is used, however, all units use the same carrier in all cells.

Figure 22:
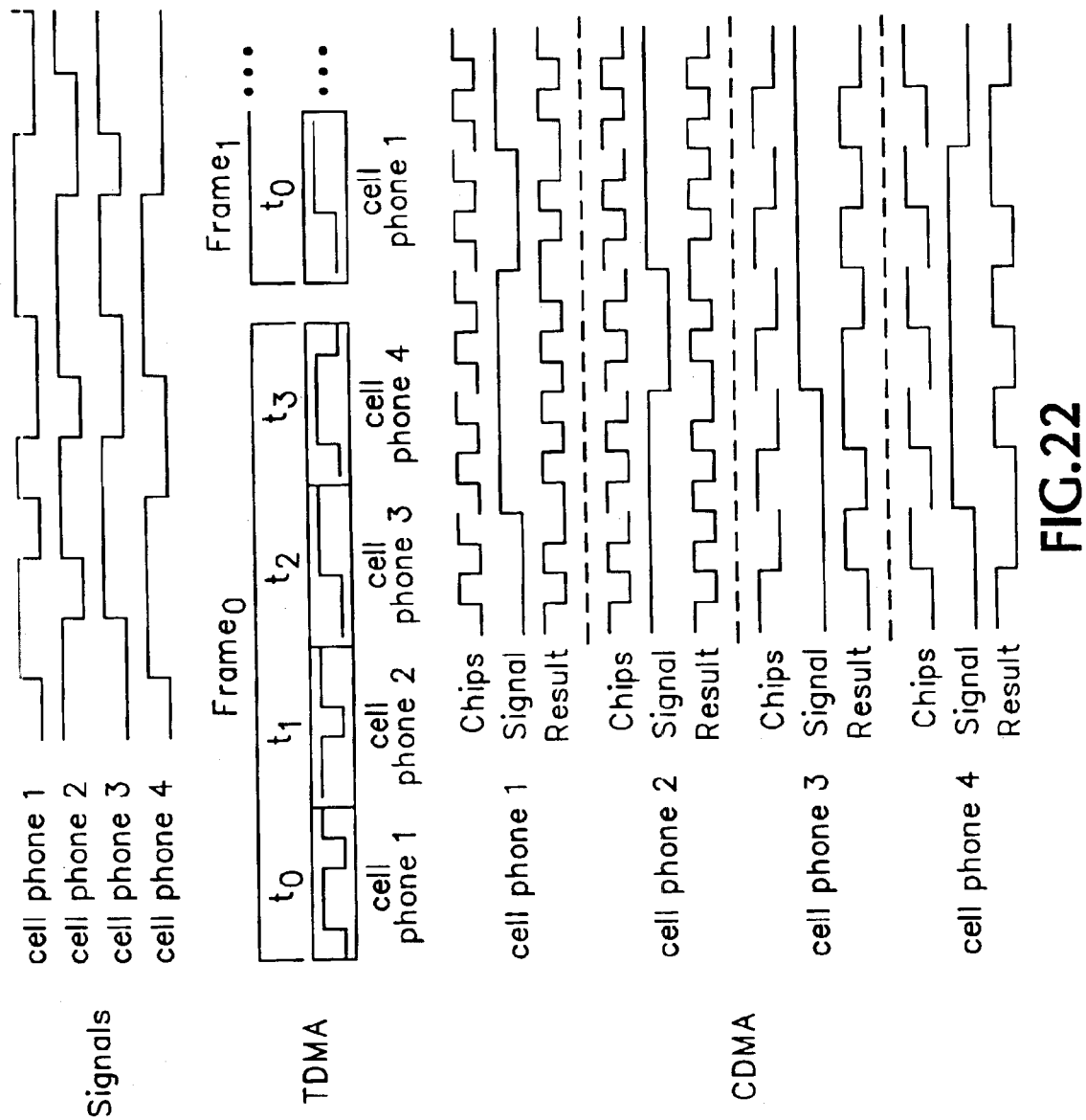
FIG. 22 is a detailed view of a typical TDMA and a typical CDMA signal for the cell phone of FIG. 16.

FIG. 22 shows TDMA and CDMA signals for four cell phones 1600. With reference to FIG. 22, for TDMA, each cell phone 1600 is assigned a time slice during which it can transmit. Cell phone 1 is assigned time slice t0, cell phone 2 is assigned time slice t1, cell phone 3 is assigned time slice t2, and cell phone 4 is assigned time slice t3. For CDMA, each cell phone 1600 is assigned a basis vector that it multiplies with its signal. Cell phone 1 is assigned the vector:

$$\begin{pmatrix} -1 \\ 1 \\ -1 \\ 1 \end{pmatrix}$$

Cell phone 2 is assigned the vector:

$$\begin{pmatrix} 1 \\ -1 \\ 1 \\ -1 \end{pmatrix}$$

Cell phone 3 is assigned the vector:

$$\begin{pmatrix} 1 \\ 1 \\ -1 \\ -1 \end{pmatrix}$$

Cell phone 4 is assigned the vector:

$$\begin{pmatrix} -1 \\ -1 \\ 1 \\ 1 \end{pmatrix}$$

Notice that these vectors form an orthogonal basis.

B. Handheld Web Browser

In the previous subsection, we demonstrated our methodology on a cell phone with a top-down design approach. In this subsection, we demonstrate our methodology with a bottom-up approach in building a handheld Web browser.

Figure 23A:
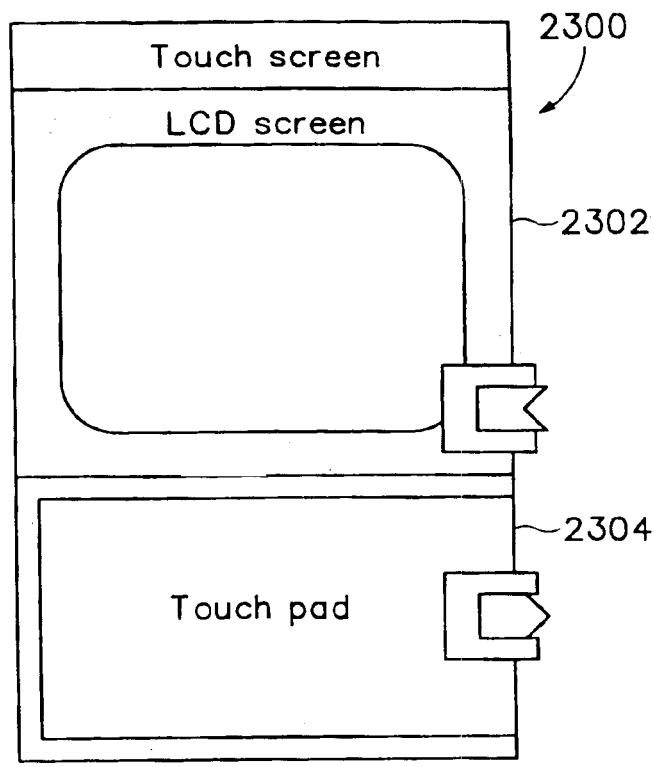
FIG. 23A is a LCD touch screen component for a Web browser GUI for a wireless device.

FIG. 23A is a LCD touch screen component 2300 for a Web browser GUI (shown in FIG. 24A) for a wireless device 1506. With reference to FIG. 23A, a LCD touch screen component 2300, has an LCD screen 2302 and a touch pad 2304.

Figure 23B:
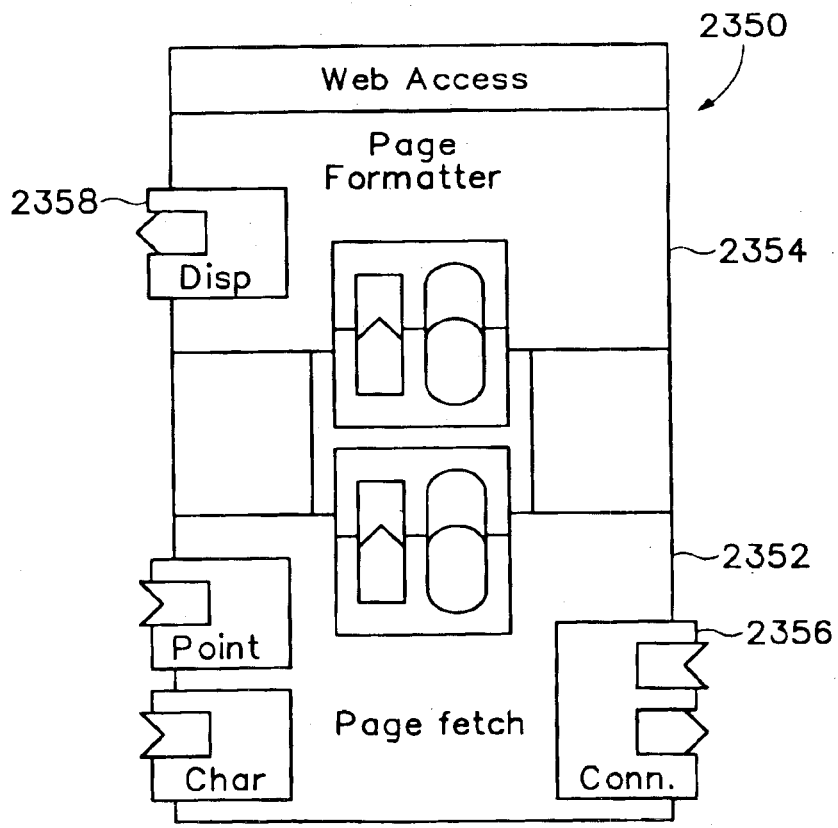
FIG. 23B is a Web page formatter component for the Web browser GUI for the wireless device.

FIG. 23B is a Web page access component 2350 for fetching and formatting web pages. With reference to FIG. 23B, web access component 2350 has a page fetch subcomponent 2352 and a page format subcomponent 2354. Web access component 2350 reads hypertext markup language (HTML) from a connection interface 2356, sends word placement requests to a display interface 2358, and sends image requests to the connection interface 2356. Web access component 2350 also has a character input interface to allow users to enter page requests directly and to fill out forms on pages that have forms.

FIG. 24A shows a completed handheld Web browser GUI 2400. With reference to FIG. 24A, handheld Web browser GUI 2400, has LCD touch screen component 2300, web access component 2350, and a pen stroke recognition component 2402 that translates pen strokes entered on touch pad 2304 into characters.

FIG. 24B shows the complete component view of a handheld Web browser 2450. With reference to FIG. 24B, handheld Web browser 2450 is formed by connecting handheld Web browser GUI 2400 to connection component 1610 of cell phone 1600 (described with reference to FIG. 16) with bi-directional data transfer coordinator 604 (described with reference to FIG. 6B). Handheld Web browser 2450 is an example of mobile unit 1506, and connects to the Internet through the cellular infrastructure described above. However, handheld Web browser 2450 has different access requirements than does cell phone 1600. For handheld Web browser 2450, reliability is more important than real-time delivery. Dropped packets usually require retransmission, so it is better to deliver a packet late than to drop it. Real-time issues primarily affect download time and are therefore secondary. Despite this, handheld Web browser 2450 must coordinate media access with cell phones 1600, and so it must use the same protocol as cell phones 1600 to connect to the network. For that reason, handheld Web browser 2450 can reuse connection component 1610 from cell phone 1600.

Coordination-Centric Framework for a Distributed Computing Environment

Figure 25:
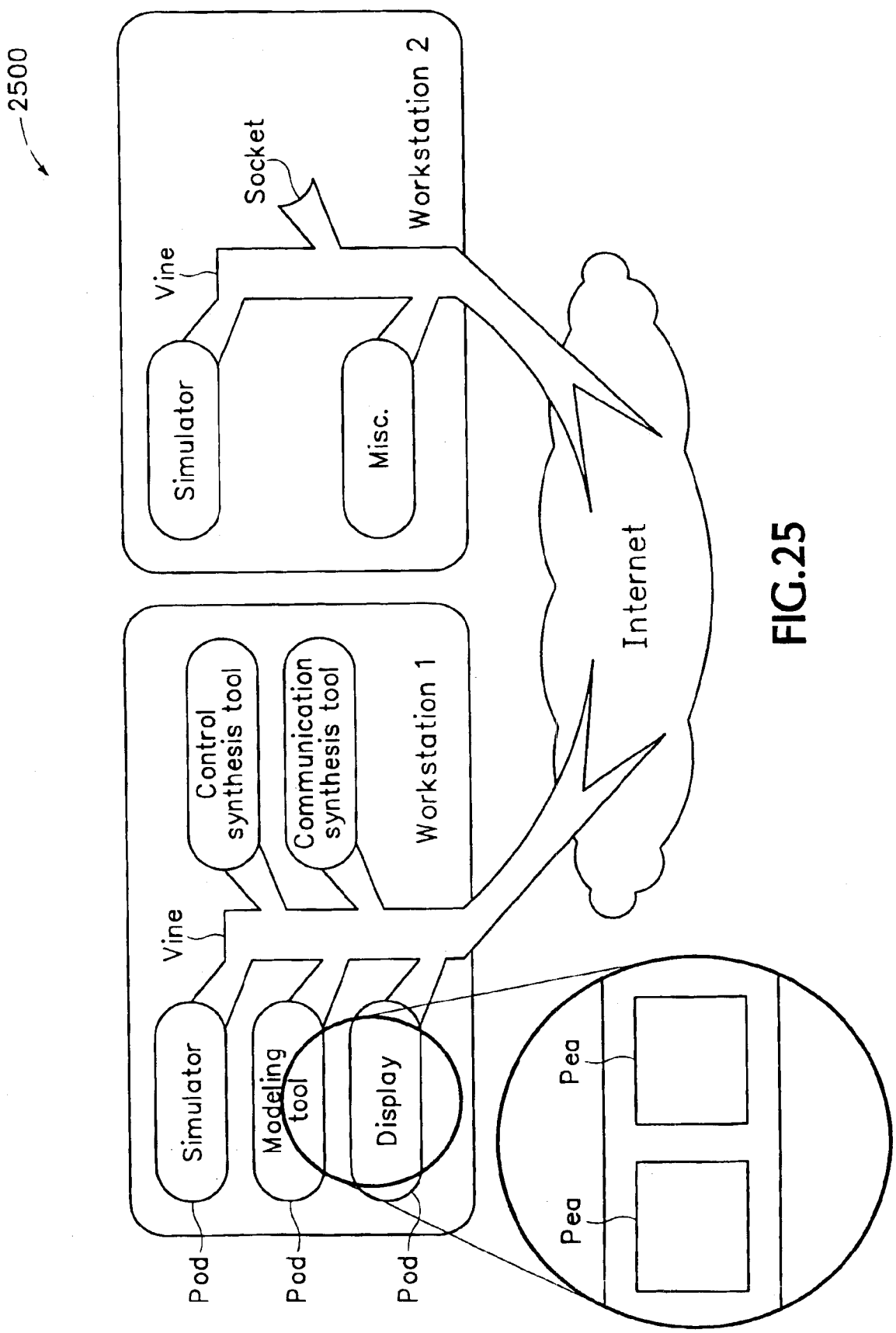
FIG. 25 depicts a coordination centric framework for designing software systems in a networked environment.

FIG. 25 depicts a coordination-centric framework 2500 for designing software systems in a networked environment. With reference to FIG. 25, coordination-centric framework 2500 typically has at least two networked VINES. Each VINE has one or more PODS. Each POD has one or more PEAS. VINES are generic runtime systems and interaction managers. Each VINE contains a number of sockets used as connection points for PODs. VINEs are similar to ORBs in CORBA in that both VINEs and ORBs manage internal objects as well as any connections between those objects. Each VINE is a self-contained runtime system for PODs. VINEs host the PODs and manage the interconnections between them. VINEs allow for dynamic insertion and removal of PODs.

A POD, once inserted into a VINE, injects a set of coordinators. PODs are containers of strongly cohesive PEAs. PEAs are objects that are dedicated to performing a single, distinct task. PODs are similar to simple objects in CORBA. PEAS are typically highly modular and highly reusable software elements that require little to no knowledge about any other software elements in a system. A POD must allow dynamic insertion of PEAs. For example, a display is a POD, and its top-level windows are PEAs.

Coordination-centric framework 2500 supports several different types of PODs, including, for example, various synthesis tools, a simulator, a modeling tool, and GUI displays. These various PODs may interact in a number of ways. For example, the modeling tool may pass data structures to one of the synthesis tools. The simulator PODs synchronize their actions in a variety of ways. PODs with GUIs can interact in as many ways as there are different types of PODs. GUIs are typically not tightly coupled with their corresponding PODs, which lets them be placed in geographically disparate locations.

1. Coordinators

Coordination-centric framework 2500 typically has two types of coordinators for controlling control and dataflow interactions between various software elements. First, coordination-centric framework 2500 has local coordinators (not shown), which exist within individual PODs. Second, coordination-centric framework 2500 has global coordinators (not shown), which are exported from PODs to a system of VINEs. The various software elements—PEAs, PODs, and VINEs—connect to local or global coordinators through a pair of coordination interfaces (not shown). The pair of coordination interfaces include various ports (not shown) for transferring control and data information between coordinators and software elements. These ports include event ports (not shown) for transferring data between coordinators and software elements, arbitrated value ports (not shown) for transferring control information between coordinators and software elements, streaming data ports, and remote procedure call ports. The latter two give direct access to connection types provided by the Java programming language.

2. The Life Cycle of PIA Platform Elements

Both VINEs and PODs have multiphase lifecycles, in which each phase represents different aspects of initialization, execution, or cleanup. This section discusses these lifecycles.

A. The Life Cycle of a VINE

Each VINE provides a complete runtime system for any PODs it contains: from a POD's perspective, the VINE represents the entire platform. In the Java implementation, a VINE is a top-level application that has "main( )" method and can instantiate other types of objects. Each VINE must be given an address for other VINEs to which it must connect. The address can be entered manually or through a script. When a VINE is terminated, it terminates all of the PODs to which it connects.

B. The Life Cycle of a POD

Figure 26:
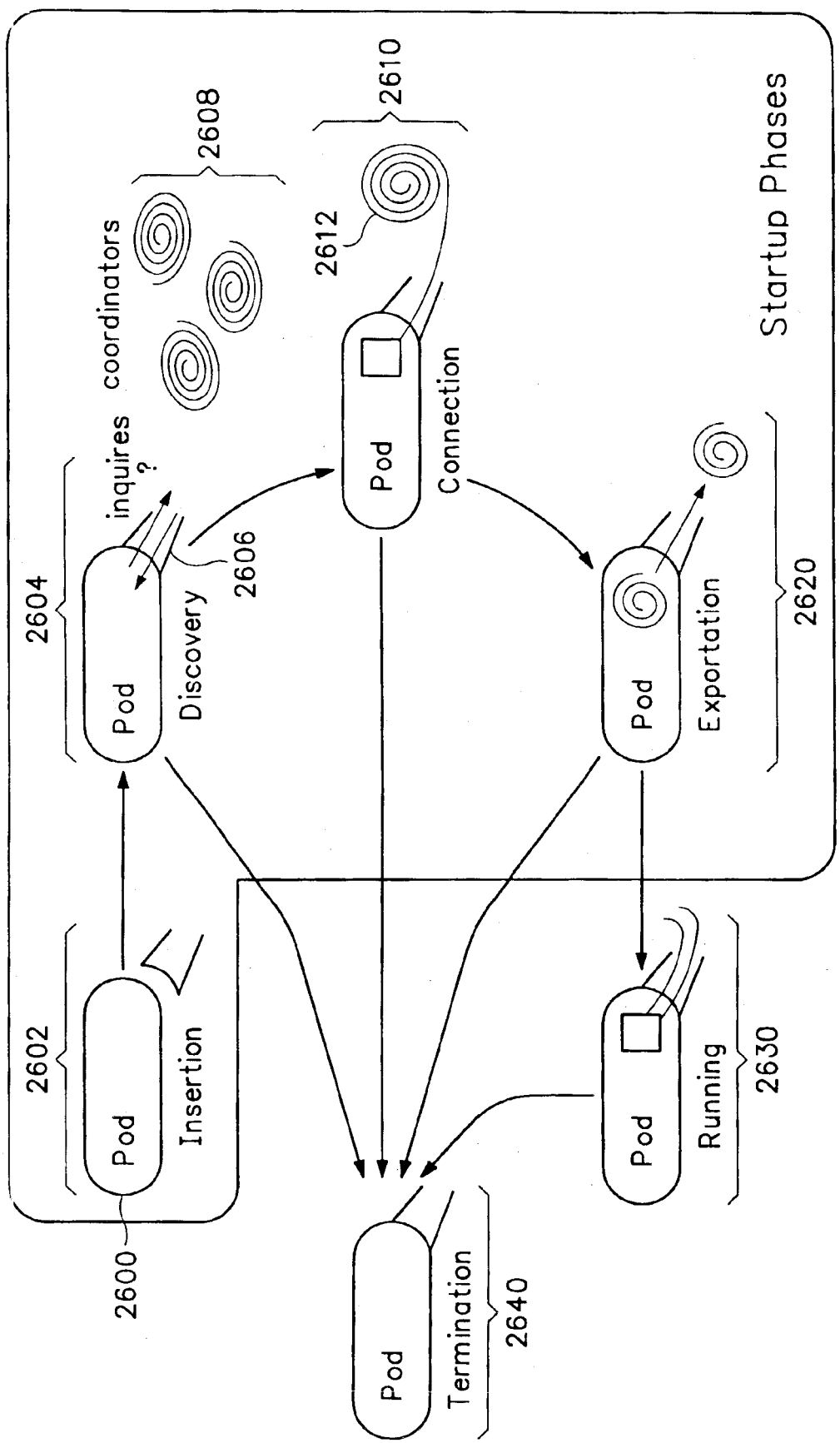
FIG. 26 depicts a set of stages in a lifecycle for a POD in accordance with the present invention.

FIG. 26 depicts a set of phases in a life cycle for a POD 2600 in accordance with the present invention. With reference to FIG. 26, an insertion phase 2602 begins after POD 2600 is instantiated and when it calls into its respective VINE (not shown) requesting a socket (not shown). In a presently preferred embodiment, POD 2600 must already be in the same memory space as the VINE to which it is connected. After POD 2600 is inserted, it begins a discovery phase 2604. POD 2600 cannot directly address a second POD (not shown), and vice versa. Instead POD 2600 must communicate with second POD through a coordinator (not shown) provided by second POD. During discovery phase 2604, POD 2600 performs various inquiries 2606 in order to determine what system resources are available for its use. Each system resource is accessed through a coordinator, of a set of coordinators 2608, provided by a POD (not shown) corresponding to the system resource. POD 2600 can execute discovery by asking its respective VINE for a specific coordinator of set of coordinators 2608 or by requesting it respective VINE to provide a directory of set of coordinators 2608. Thus, during discovery phase 2604, POD 2600 determines set of coordinators 2608 to which it may connect.

Following discovery phase 2604, POD 2600 enters a connection phase 2610. During connection phase 2610, POD 2600 physically connects to a specific coordinator 2612, of set of coordinators 2608, provided by the second POD. POD 2600 can re-execute discovery phase 2604 and connection phase 2610 at any subsequent time. POD 2600 can also establish a "hot-list" of specific coordinators, within set of coordinators 2608, to which POD 2600 will connect when those specific coordinators are available, thereby speeding up subsequent discovery phases 2604 and connection phases 2610.

After POD 2600 is connected, it enters an exportation phase 2620, in which POD 2600 exports a set of coordinators (not shown) that are made available for allowing any other PODs (not shown) within the system to establish a connection with POD 2600. Next, POD 2600 begins a running phase 2630. During running phase 2630 POD 2600 performs a predetermined functionality. It is in running phase 2630 that POD 2600 can respond to the exported set of coordinators it provided to its respective VINE (e.g., putting up windows if POD 2600 is a display).

Eventually, when POD 2600 is no longer required, or when its respective VINE is terminated, it enters a termination phase 2640, in which it the shuts down the exported set of coordinators it provided to its respective VINE. This means that each coordinator must also have a termination phase. Exiting with a termination phase lets POD 2600 clean up after itself.

3. Common Types of PODs

This section describes five common types of PODs: synthesis tools, simulators, modeling tools, GUI displays, and analysis tools.

A. Synthesis Tools

Two types of synthesis plug-ins are part of a toolset pod (not shown) in accordance with the present invention. The first is a coordination synthesis tool. Coordination synthesis transforms intraprocessing element coordination into shared memory interactions and interprocessing element coordination into platform-independent communication. The second type is a communication synthesis tool. Communication synthesis transforms platform-independent communication into platform- and protocol-specific communication.

B. Simulators

Coordination-centric framework 2500 typically has a simulator POD (not shown). One possible type of simulator pod is a distributed simulator. A distributed simulator consists of a number of interconnected segments that give the overall impression of a single simulator. There are several situations in which it makes sense to distribute a simulator. For example, if higher simulation performance is required, a simulator can be distributed over a number of computers joined by a high-speed network to improve overall performance. If access to geographically dispersed resources is required, a simulator can be distributed over the Internet to provide access to those geographically dispersed resources.

There are two ways to interconnect distributed pieces of the simulator to produce a simulation environment. They can be connected conservatively, so that no single element can proceed past a moment in virtual time until all other elements have performed any work that was scheduled for an earlier virtual time. The distributed pieces of the simulator can also be connected optimistically, so that any segment can advance as far as it wants. However, if it turns out that work was missed, the simulator must rewind its execution to a point before the miss.

C. Modeling Tools

A modeling tool is the front end of a compiler. Two types of modeling tools are included in a presently preferred embodiment of coordination-centric framework 2500: one for software and one for hardware. These tools enforce a separation between the model itself and the way it is viewed. Modeling tools may include a GUI, which can be deployed to a display POD (see Section 6.3.4). Modeling tools manipulate data structures associated with aspects of a specification.

D. Displays and GUIs

GUIs are PEAs that provide an interface to another tool. A display organizes and presents GUIs supplied by other sources, primarily other PODs. GUIs interact with their environment differently than other PEAs. Normally, PEAs within a POD interact more with each other than with PEAs in different PODs. GUIs, on the other hand, have minimal interactions with other GUIs in their display; in fact, the only interactions between GUIs on the same display relate to layout. GUIs may have substantial interactions with PEAs on other PODs, notably the POD that the GUI serves. GUIs can be instantiated at the serviced POD or at the display itself. In both cases, the display passes a pointer to itself to the GUI and performs basic GUI management functions, such as providing layout management, communicating mouse locations and mouse presses, etc. Built-in Java support is used to implement as much of the coordination-centric framework as is feasible because the Java language has built-in support for concurrence and networking as well as comprehensive foundation classes. When appropriate, the present invention is implemented using existing Java functionality or Java toolkits (such as Java's RMI, instead of the general RPC coordinators, and the Java foundation classes).

Figure 27:
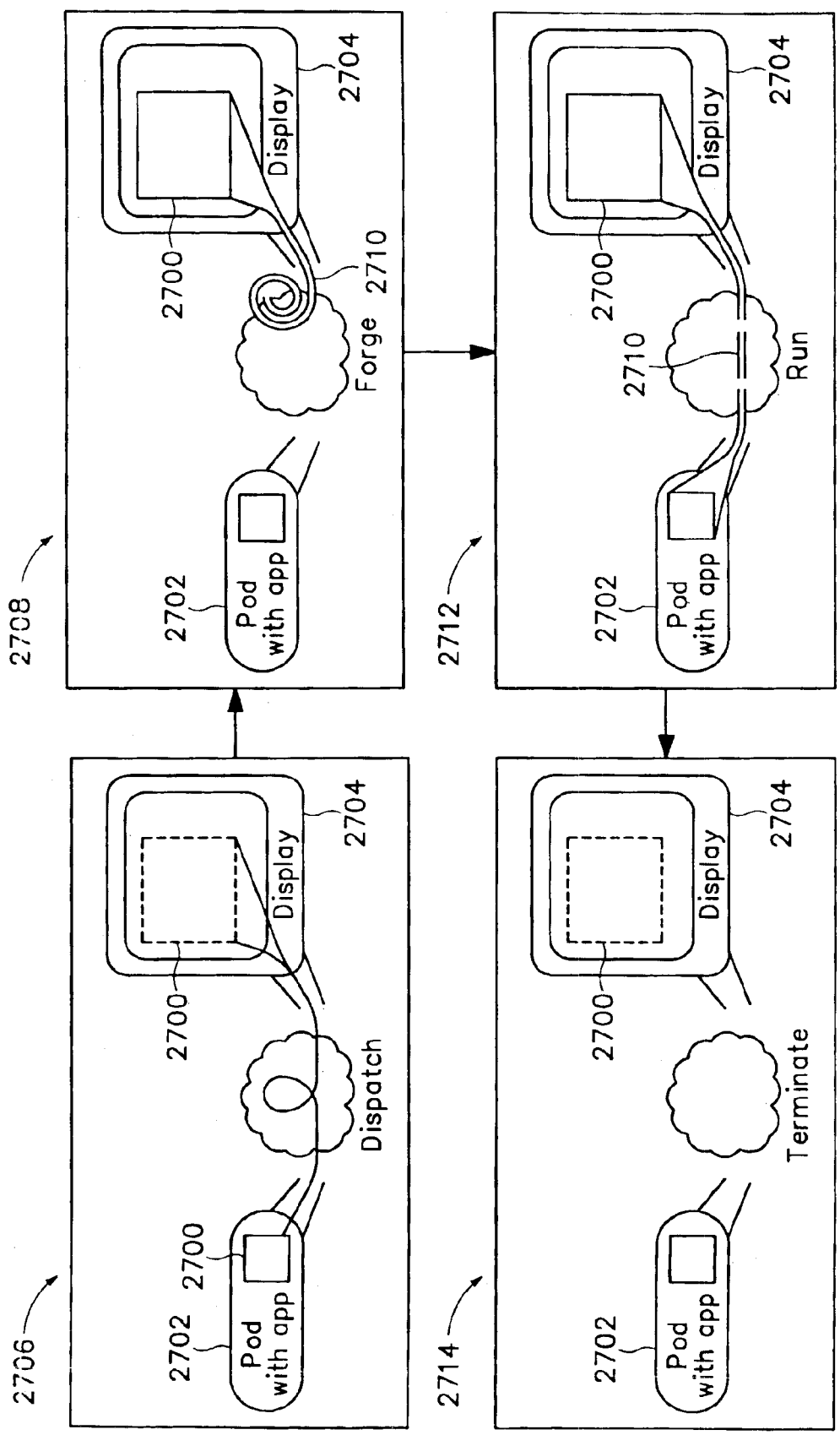
FIG. 27 displays a lifecycle of a GUI PEA.

FIG. 27 displays a life cycle of a GUI PEA 2700. With reference to FIG. 27, GUI PEA 2700 is dispatched from an origination POD 2702 and initialized on an appropriate display POD 2704 during a dispatch phase 2706. GUI PEA 2700, once initialized, will enter a forging phase 2708 in which it forges a connection 2710 back to origination POD 2702. Again, display POD 2704 is not specifically visible to origination POD 2702. Display POD 2704 does, however, provide a connection coordinator (not shown) through which GUI PEA 2700 can be transferred from origination POD 2702 to display POD 2704. Once a connection is forged between GUI PEA 2700 and origination POD 2702, GUI PEA 2700 enters a running phase 2712. Finally, GUI PEA 2700 will enter a termination phase 2714 during which it will close connection 2710 and terminate itself. This system provides similar separation to that offered by an X-Windows system. However, unlike in the X-Windows system, in coordination-centric framework 2500 each GUI is active, containing code that is dispatched on a virtual machine for display POD 2704.

GUI PEA 2700 should be a thin client for any application programs it serves. Thus any computational burden associated with an application program (not shown) served by GUI PEA 2700 should reside with origination POD 2702. Though it is preferable for GUI PEA 2700 to be a thin client, it is not a requirement. Display POD 2704 typically does not specifically check to determine how much computation is performed by GUI PEA 2700. However, in the presently preferred embodiment, a coordination-centric security manager (not shown), which is similar to a Java applet security manager, ensures that GUI PEA 2700 is excluded from any behaviors that might infringe on the security of a machine hosting GUI PEA 2700.

Display POD 2704 can be implemented as a Java applet to be run on a web browser. Since the Java security model adopted by most browsers allows connections only to the specific host that served the top-level applet, a single point of contact must be provided for the display to obtain and connect to origination POD 2702 providing GUI POD 2700.

E. Analysis Tools

Coordination-centric framework 2500 typically provides both a debugger (not shown) and a static analysis tool (not shown), which are implemented as a debugger POD (not shown) and a static analysis POD (not shown), respectively, attached to one or more VINEs within coordination-centric framework 2500. Debugger POD typically supplies a display POD (not shown) with a debugger GUI (not shown) to present a designer with graphical representations of system executions (both actual and simulated), as well as a text viewer (not shown) for displaying source code. However, static analysis PODs supply no GUI. Debugger PODs must coordinate with modeling PODs, simulation PODs, and a set of PODs that provide connections to physical hardware. Static analysis PODs must primarily coordinate with modeling tools.

It will be obvious to those having skill in the art that many changes may be made to the details of the above-described embodiment of this invention without departing from the underlying principles thereof. The scope of the present invention should, therefore, be determined only by the following claims.

What is claimed is:

1. A system for implementing a modular software system in a distributed computing environment, the distributed computing environment having a plurality of networked processing resources, comprising:

a first and a second general runtime component which are capable of communicating with each other;

the first and second general runtime components each comprising a plurality of sockets for connecting to a lower level component and managing interactions between the lower level components;

the first and second general runtime components each capable of operating on one of the plurality of networked processing resources;

a first and a second container component for engaging one of the plurality of sockets of one of the general runtime components;

the first container component implements a first predetermined functionality and comprises a first container coordinator for allowing the second container component to communicate with the first container component through their respective general runtime components; and a first and second functional component within one of the container components;

the first functional component performs a second predetermined functionality and comprises a first functional coordinator for allowing the second functional component to communicate with the first functional component.

2. A system according to claim 1 wherein the first container component can be dynamically inserted into the first general runtime component, at which point the first container component introduces its first container coordinator into the first general runtime component.

3. A system according to claim 2 wherein the second container component may then establish a connection with the first container component via the first container coordinator.

4. A system according to claim 3 wherein the first functional component can be dynamically inserted into the first container component, at which point the first functional component can introduce its first functional coordinator into the first container component.

5. A system according to claim 4 wherein the second function component may then establish a connection with the first container component via the first container coordinator.

6. A system according to claim 5 wherein the first functional component may be dynamically terminated from the first container component.

7. A system according to claim 6 wherein the first functional component will enter a functional termination phase upon being dynamically terminated and will terminate the first functional coordinator prior to completing the functional termination phase.

8. A system according to claim 7 wherein the first container component may be dynamically terminated from the first general runtime component.

9. A system according to claim 8 wherein the first container component will enter a container termination phase upon being dynamically terminated and will terminate the first functional component prior to completing the container termination phase.

10. A method for implementing a modular software system on a distributed computing platform, the distributed computing platform having a plurality of connected processing resources, the method comprising:

providing a first and a second general runtime component which are capable of operating on one of the plurality of processing resources and of communicating with each other, and each of which comprise a plurality of sockets for connecting to a lower level component and managing interactions between the lower level components;

providing a first and a second container component for implementing a first and second predetermined functionality, respectively, dynamically connecting the first and second container components into the one of the plurality of sockets in the first and second general runtime components, respectively;

with the first container component, inserting a first container coordinator into the first general runtime component, thereby creating a connection point for the second container component to initiate communication with the first container component by connecting to the first container coordinator;

providing a first and second functional component for performing a third and fourth predetermined functionality, respectively, within the first container component;

dynamically introducing the first functional component into the first container component; and with the first functional component, inserting a first functional coordinator into the first container component, thereby creating a connection point for the second functional component to initiate communication with the first functional component by connecting to the first functional coordinator.

11. A method according to claim 10 further comprising:

dynamically removing the first container component from the first general runtime component; and in the first container component, terminating the first functional component.

12. A method according to claim 11 further comprising:

in the first functional component, terminating and withdrawing the first functional coordinator.

* * * * *